US012647911B2

(12) United States Patent (10) Patent No.: US 12,647,911 B2
Paz et al. (45) Date of Patent: Jun. 2, 2026

(54) EXTENDED REALITY DEVICE SYNCHRONIZATION MANAGEMENT

(71) Applicant: QUALCOMM Incorporated, San Diego, CA (US)

(72) Inventors: Daniel Paz, Atlit (IL); Assaf Touboul, Netanya (IL); Michael Levitsky, Rehovot (IL); Tom Barak, Rehovot (IL); Alexander Sverdlov, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 18/240,820

(22) Filed: Aug. 31, 2023

(65) Prior Publication Data

US 2025/0081129 A1 Mar. 6, 2025

(51) Int. Cl.
*H04W 56/00* (2009.01)
(52) U.S. Cl.
CPC ..... *H04W 56/001* (2013.01); *H04W 56/0045* (2013.01)

(58) Field of Classification Search
None
See application file for complete search history.

(56) References Cited

U.S. PATENT DOCUMENTS

2021/0104211 A1* 4/2021 John ...................... G06F 3/011

* cited by examiner

*Primary Examiner* — Saad Khawar
(74) *Attorney, Agent, or Firm* — Holland & Hart LLP

(57) ABSTRACT

Methods, systems, and devices for wireless communications are described. A user equipment (UE) may perform an initialization procedure with an extended reality (XR) device including a time synchronization and a frequency synchronization. The UE may receive, from the XR device and at a first periodicity, first pilot signals, and may transmit, based on receiving the first pilot signals, a first control message indicating a first set of correction factors to apply to at least one of the time synchronization or the frequency synchronization. The UE may transmit, to the XR device and at a second periodicity, a second pilot signal, and may receive, from the XR device, a second control message including samples of the second pilot signal. The UE may transmit, based on the samples, a third control message indicating a second set of correction factors to apply to the time synchronization between the UE and the XR device.

30 Claims, 19 Drawing Sheets

STO/CFO Estimation 315

Synchronization Loop Management 320

Channel Estimation 325

Channel Equalization 330

115-b

Channel

N

Digital FE

Channel Sampling 335

Noise Estimation 340

CPE Correction

LLR Calculation

Decoding 345

305

300

510

520

515

505

500

Receiver

Communications Manager

Transmitter

910

920

915

905

900

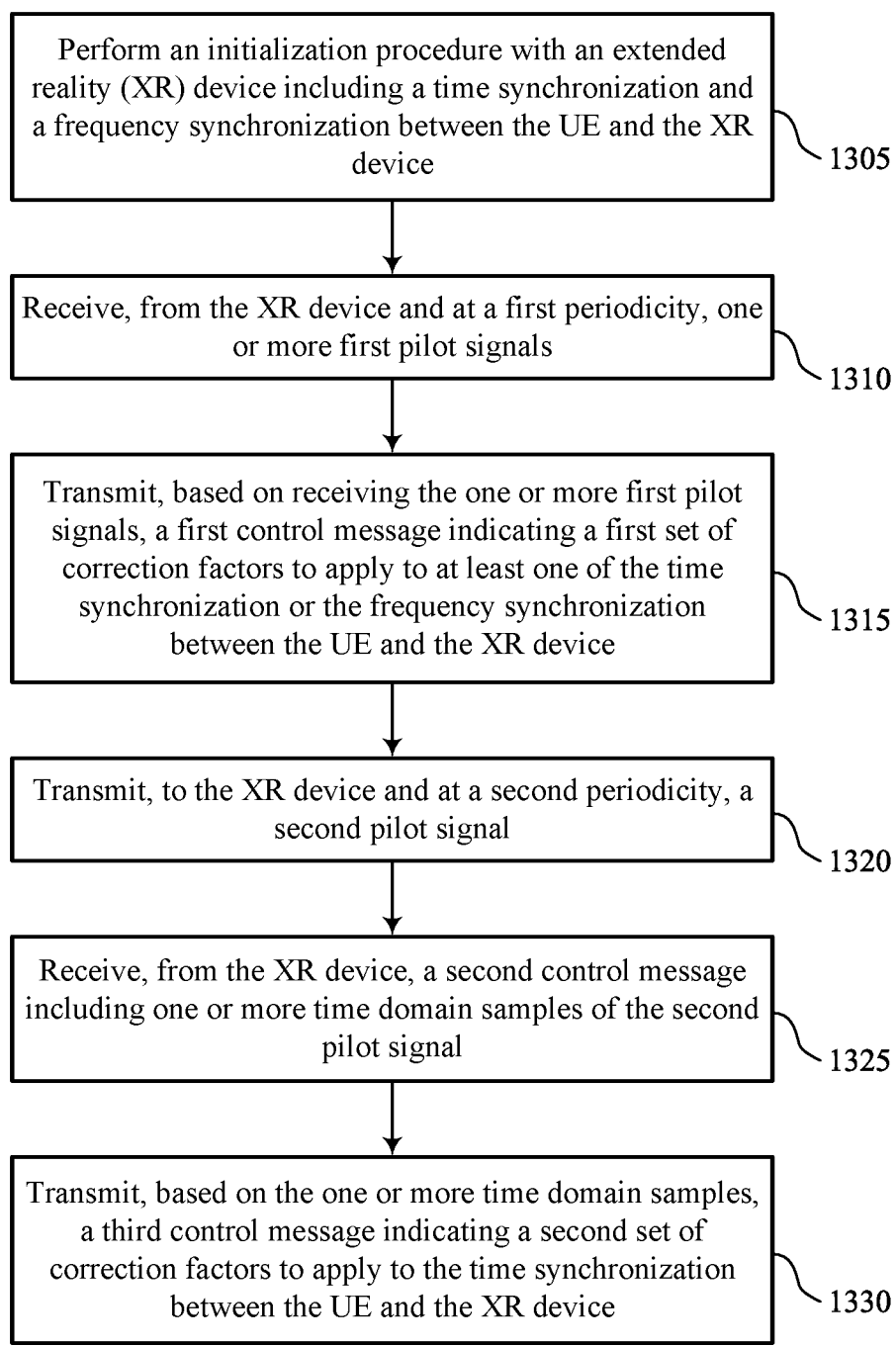

Perform an initialization procedure with an extended reality (XR) device including a time synchronization and a frequency synchronization between the UE and the XR device

~1305

Receive, from the XR device and at a first periodicity, one or more first pilot signals

~1310

Transmit, based on receiving the one or more first pilot signals, a first control message indicating a first set of correction factors to apply to at least one of the time synchronization or the frequency synchronization between the UE and the XR device

~1315

Transmit, to the XR device and at a second periodicity, a second pilot signal

~1320

Receive, from the XR device, a second control message including one or more time domain samples of the second pilot signal

~1325

Transmit, based on the one or more time domain samples, a third control message indicating a second set of correction factors to apply to the time synchronization between the UE and the XR device

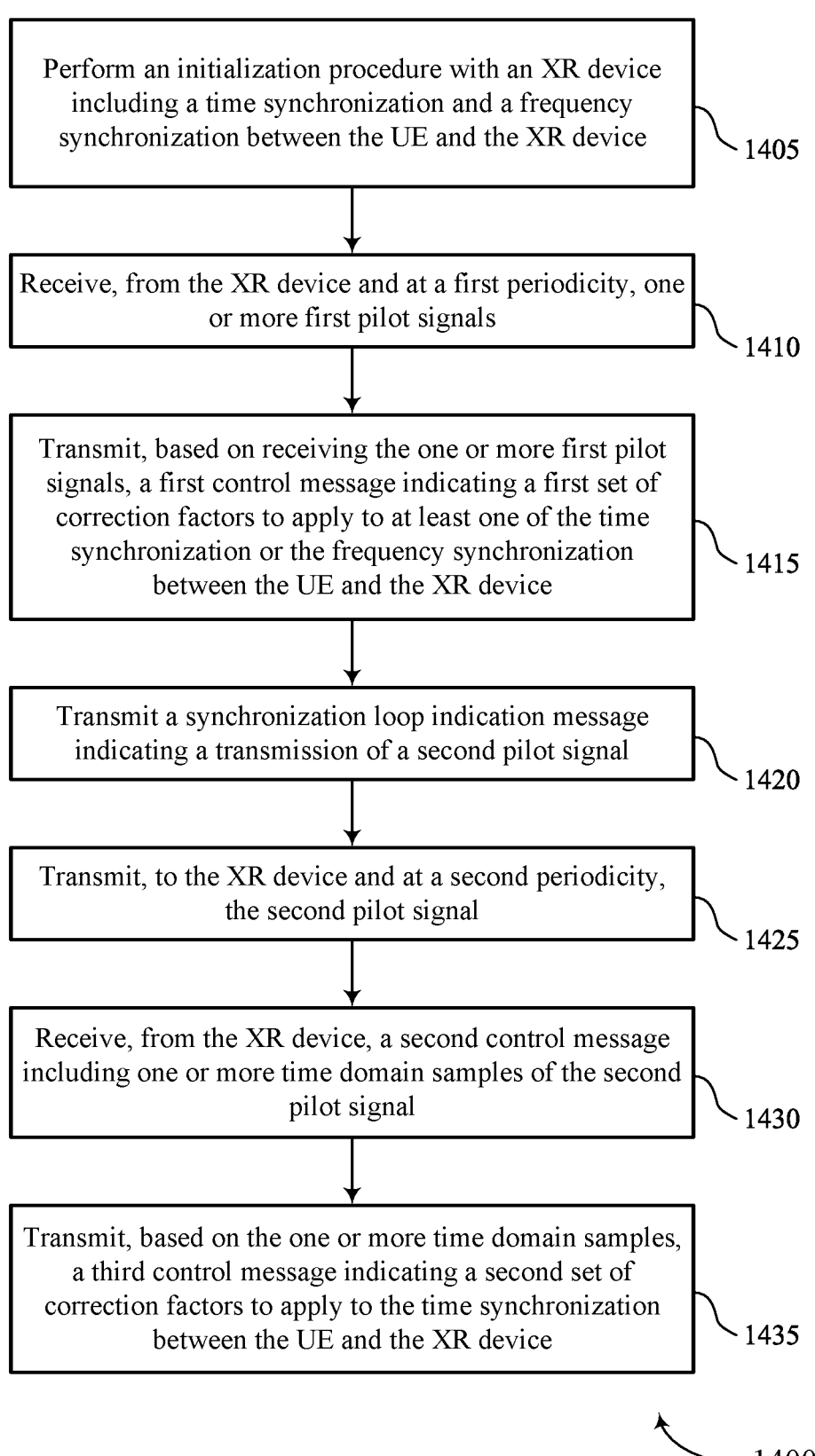

Perform an initialization procedure with an XR device including a time synchronization and a frequency synchronization between the UE and the XR device
1405

Receive, from the XR device and at a first periodicity, one or more first pilot signals
1410

Transmit, based on receiving the one or more first pilot signals, a first control message indicating a first set of correction factors to apply to at least one of the time synchronization or the frequency synchronization between the UE and the XR device
1415

Transmit a synchronization loop indication message indicating a transmission of a second pilot signal
1420

Transmit, to the XR device and at a second periodicity, the second pilot signal
1425

Receive, from the XR device, a second control message including one or more time domain samples of the second pilot signal
1430

Transmit, based on the one or more time domain samples, a third control message indicating a second set of correction factors to apply to the time synchronization between the UE and the XR device
1435

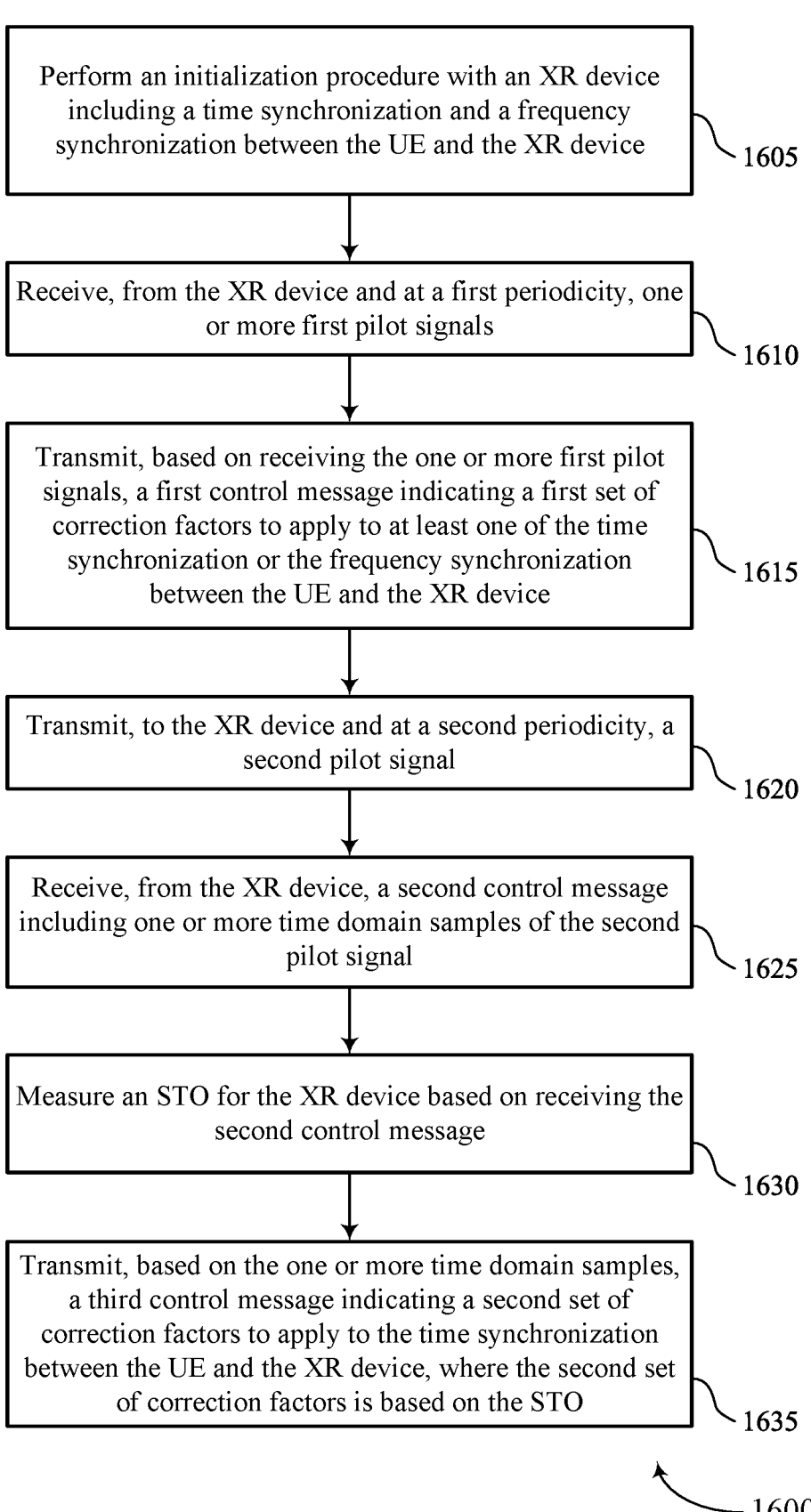

Perform an initialization procedure with an XR device including a time synchronization and a frequency synchronization between the UE and the XR device

1605

Receive, from the XR device and at a first periodicity, one or more first pilot signals

1610

Transmit, based on receiving the one or more first pilot signals, a first control message indicating a first set of correction factors to apply to at least one of the time synchronization or the frequency synchronization between the UE and the XR device

1615

Transmit, to the XR device and at a second periodicity, a second pilot signal

1620

Receive, from the XR device, a second control message including one or more time domain samples of the second pilot signal

1625

Measure an STO for the XR device based on receiving the second control message

1630

Transmit, based on the one or more time domain samples, a third control message indicating a second set of correction factors to apply to the time synchronization between the UE and the XR device, where the second set of correction factors is based on the STO

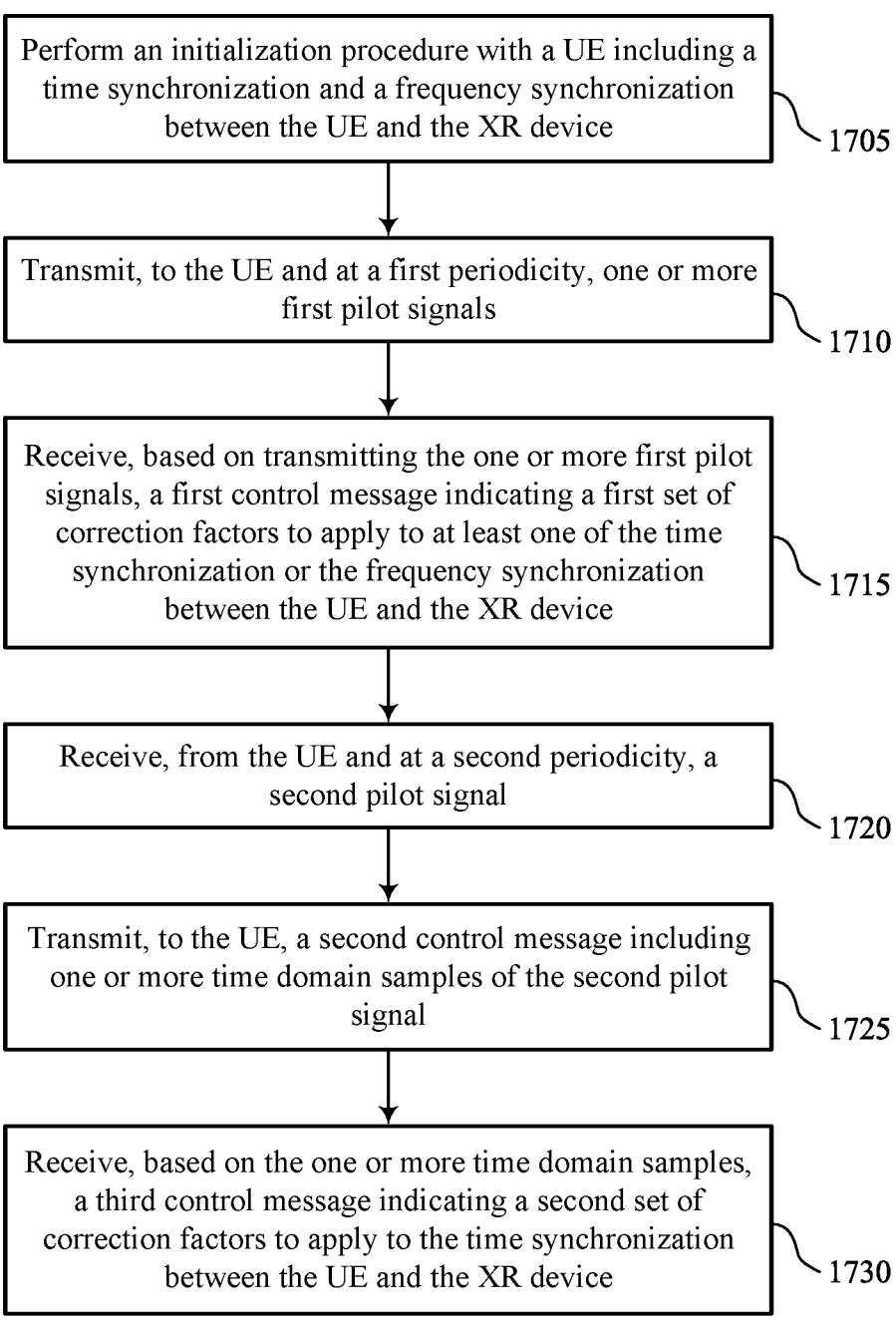

Perform an initialization procedure with a UE including a time synchronization and a frequency synchronization between the UE and the XR device

1705

Transmit, to the UE and at a first periodicity, one or more first pilot signals

1710

Receive, based on transmitting the one or more first pilot signals, a first control message indicating a first set of correction factors to apply to at least one of the time synchronization or the frequency synchronization between the UE and the XR device

1715

Receive, from the UE and at a second periodicity, a second pilot signal

1720

Transmit, to the UE, a second control message including one or more time domain samples of the second pilot signal

1725

Receive, based on the one or more time domain samples, a third control message indicating a second set of correction factors to apply to the time synchronization between the UE and the XR device

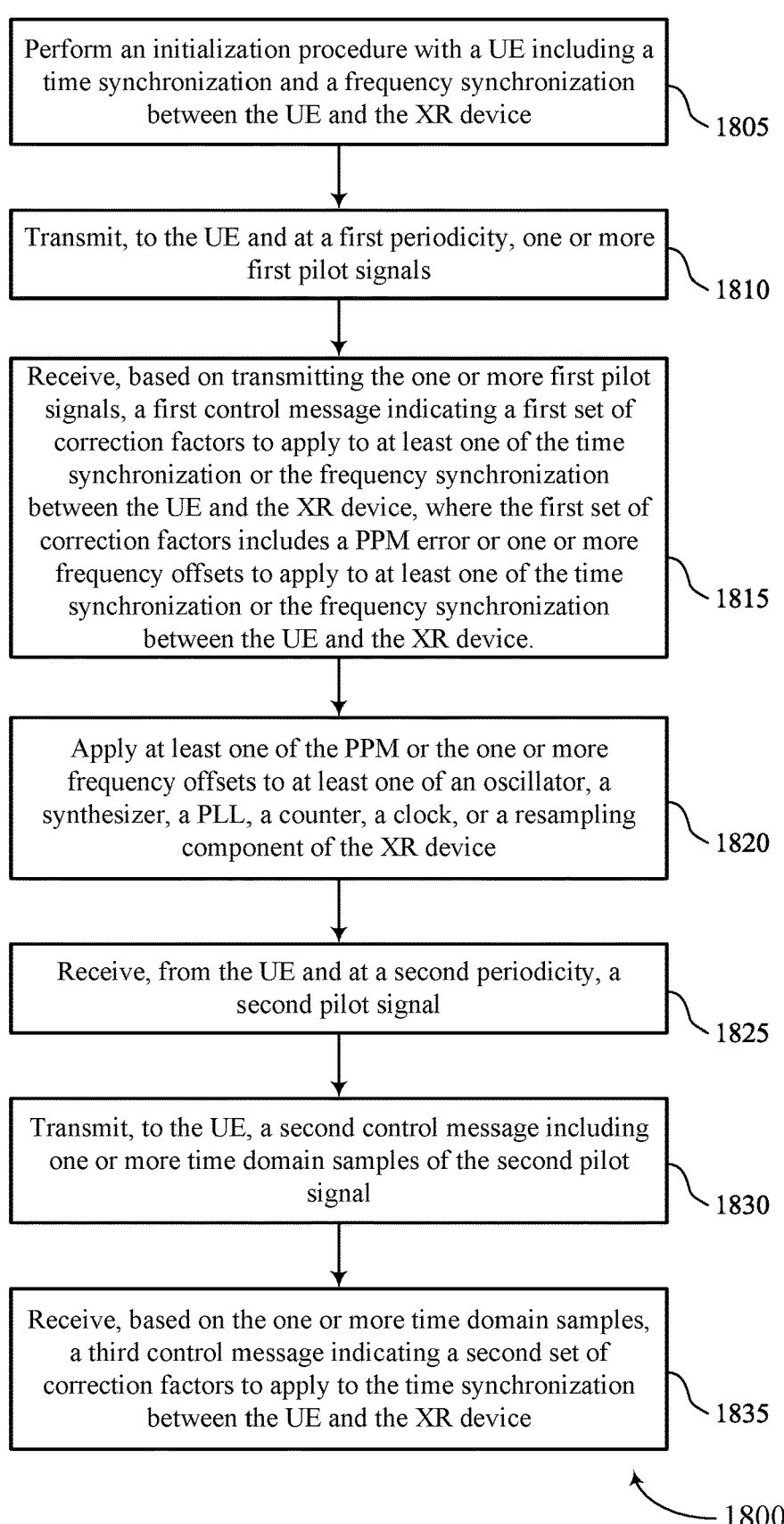

Perform an initialization procedure with a UE including a time synchronization and a frequency synchronization between the UE and the XR device
1805

Transmit, to the UE and at a first periodicity, one or more first pilot signals
1810

Receive, based on transmitting the one or more first pilot signals, a first control message indicating a first set of correction factors to apply to at least one of the time synchronization or the frequency synchronization between the UE and the XR device, where the first set of correction factors includes a PPM error or one or more frequency offsets to apply to at least one of the time synchronization or the frequency synchronization between the UE and the XR device.
1815

Apply at least one of the PPM or the one or more frequency offsets to at least one of an oscillator, a synthesizer, a PLL, a counter, a clock, or a resampling component of the XR device
1820

Receive, from the UE and at a second periodicity, a second pilot signal
1825

Transmit, to the UE, a second control message including one or more time domain samples of the second pilot signal
1830

Receive, based on the one or more time domain samples, a third control message indicating a second set of correction factors to apply to the time synchronization between the UE and the XR device
1835

EXTENDED REALITY DEVICE SYNCHRONIZATION MANAGEMENT

FIELD OF TECHNOLOGY

The following relates to wireless communications, including extended reality (XR) device synchronization management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support extended reality (XR) device synchronization management. For example, the described techniques enable an XR device to offload, to a companion device such as a user equipment (UE), processes related to estimation of a center frequency offset (CFO) and a sampling timing offset (STO), as well as management of time and frequency synchronization loops. The UE may track and/or correct time and frequency synchronization between the UE and the XR device. For example, the UE may facilitate communication and measurement (e.g., sampling) of pilot signals that are communicated between the UE and the XR device. The UE may perform measurement of the CFO and the STO associated with the XR device in accordance with communication of the pilot signals. Based on measuring the CFO and the STO, the UE may transmit one or more correction factors that the XR device may apply to the time or frequency synchronization between the UE and the XR device.

A method for wireless communication by a UE is described. The method may include performing an initialization procedure with an XR device including a time synchronization and a frequency synchronization between the UE and the XR device, receiving, from the XR device and at a first periodicity, one or more first pilot signals, transmitting, based on receiving the one or more first pilot signals, a first control message indicating a first set of correction factors to apply to at least one of the time synchronization or the frequency synchronization between the UE and the XR device, transmitting, to the XR device and at a second periodicity, a second pilot signal, receiving, from the XR device, a second control message including one or more time domain samples of the second pilot signal, and transmitting, based on the one or more time domain samples, a third control message indicating a second set of correction factors to apply to the time synchronization between the UE and the XR device.

A UE for wireless communication is described. The UE may include one or more memories storing processor executable code, and one or more processors coupled with the one or more memories. The one or more processors may be individually or collectively operable to execute the code to cause the UE to perform an initialization procedure with an XR device including a time synchronization and a frequency synchronization between the UE and the XR device, receive, from the XR device and at a first periodicity, one or more first pilot signals, transmit, based on receiving the one or more first pilot signals, a first control message indicating a first set of correction factors to apply to at least one of the time synchronization or the frequency synchronization between the UE and the XR device, transmit, to the XR device and at a second periodicity, a second pilot signal, receive, from the XR device, a second control message including one or more time domain samples of the second pilot signal, and transmit, based on the one or more time domain samples, a third control message indicating a second set of correction factors to apply to the time synchronization between the UE and the XR device.

Another UE for wireless communication is described. The UE may include means for performing an initialization procedure with an XR device including a time synchronization and a frequency synchronization between the UE and the XR device, means for receiving, from the XR device and at a first periodicity, one or more first pilot signals, means for transmitting, based on receiving the one or more first pilot signals, a first control message indicating a first set of correction factors to apply to at least one of the time synchronization or the frequency synchronization between the UE and the XR device, means for transmitting, to the XR device and at a second periodicity, a second pilot signal, means for receiving, from the XR device, a second control message including one or more time domain samples of the second pilot signal, and means for transmitting, based on the one or more time domain samples, a third control message indicating a second set of correction factors to apply to the time synchronization between the UE and the XR device.

A non-transitory computer-readable medium storing code for wireless communication is described. The code may include instructions executable by one or more processors to perform an initialization procedure with an XR device including a time synchronization and a frequency synchronization between the UE and the XR device, receive, from the XR device and at a first periodicity, one or more first pilot signals, transmit, based on receiving the one or more first pilot signals, a first control message indicating a first set of correction factors to apply to at least one of the time synchronization or the frequency synchronization between the UE and the XR device, transmit, to the XR device and at a second periodicity, a second pilot signal, receive, from the XR device, a second control message including one or more time domain samples of the second pilot signal, and transmit, based on the one or more time domain samples, a third control message indicating a second set of correction factors to apply to the time synchronization between the UE and the XR device.

In some examples of the method, UEs, and non-transitory computer-readable medium described herein, transmitting the second pilot signal may include operations, features, means, or instructions for transmitting a synchronization loop indication message indicating a transmission of the second pilot signal.

Some examples of the method, UEs, and non-transitory computer-readable medium described herein may further include operations, features, means, or instructions for measuring a CFO for the XR device based on receiving the one or more first pilot signals, where the first set of correction factors may be based on the CFO.

In some examples of the method, UEs, and non-transitory computer-readable medium described herein, measuring the CFO may include operations, features, means, or instructions for averaging the one or more first pilot signals or applying a loop filter to the one or more first pilot signals.

Some examples of the method, UEs, and non-transitory computer-readable medium described herein may further include operations, features, means, or instructions for calculating a parts per million (PPM) error or one or more frequency offsets based on the CFO, where the first set of correction factors includes the PPM error or the one or more frequency offsets.

Some examples of the method, UEs, and non-transitory computer-readable medium described herein may further include operations, features, means, or instructions for measuring a STO for the XR device based on receiving the second control message, where the second set of correction factors may be based on the STO.

In some examples of the method, UEs, and non-transitory computer-readable medium described herein, measuring the STO may include operations, features, means, or instructions for averaging the one or more time domain samples of the second pilot signal or applying a loop filter to the one or more time domain samples of the second pilot signal.

Some examples of the method, UEs, and non-transitory computer-readable medium described herein may further include operations, features, means, or instructions for transmitting, based on a channel propagation delay associated with receiving the one or more first pilot signals, an indication of one or more time advance values to apply to the time synchronization between the UE and the XR device, where the one or more time advance values may be different from the first set of correction factors.

In some examples of the method, UEs, and non-transitory computer-readable medium described herein, a quantity of the one or more first pilot signals may be based on a signal to noise ratio (SNR) associated with the wireless communication between the UE and the XR device.

Some examples of the method, UEs, and non-transitory computer-readable medium described herein may further include operations, features, means, or instructions for transmitting, to the XR device, an indication of the first periodicity and the second periodicity, where the second periodicity may be less than the first periodicity.

In some examples of the method, UEs, and non-transitory computer-readable medium described herein, the one or more first pilot signals or the second pilot signal correspond to least one of a synchronization signal block (SSB), a sidelink synchronization signal (SSS), a tracking reference signal (TRS), a phase TRS (PTRS), a demodulation reference signal (DMRS), or a combination thereof.

In some examples of the method, UEs, and non-transitory computer-readable medium described herein, the first control message, the second control message, or the third control message may be communicated via sidelink control information (SCI) Format 1.

A method for wireless communication by an XR device is described. The method may include performing an initialization procedure with a UE including a time synchronization and a frequency synchronization between the UE and the XR device, transmitting, to the UE and at a first periodicity, one or more first pilot signals, receiving, based on transmitting the one or more first pilot signals, a first control message indicating a first set of correction factors to apply to at least one of the time synchronization or the frequency synchronization between the UE and the XR device, receiving, from the UE and at a second periodicity, a second pilot signal, transmitting, to the UE, a second control message including one or more time domain samples of the second pilot signal, and receiving, based on the one or more time domain samples, a third control message indicating a second set of correction factors to apply to the time synchronization between the UE and the XR device.

An XR device for wireless communication is described. The XR device may include one or more memories storing processor executable code, and one or more processors coupled with the one or more memories. The one or more processors may be individually or collectively operable to execute the code to cause the XR device to perform an initialization procedure with a UE including a time synchronization and a frequency synchronization between the UE and the XR device, transmit, to the UE and at a first periodicity, one or more first pilot signals, receive, based on transmitting the one or more first pilot signals, a first control message indicating a first set of correction factors to apply to at least one of the time synchronization or the frequency synchronization between the UE and the XR device, receive, from the UE and at a second periodicity, a second pilot signal, transmit, to the UE, a second control message including one or more time domain samples of the second pilot signal, and receive, based on the one or more time domain samples, a third control message indicating a second set of correction factors to apply to the time synchronization between the UE and the XR device.

Another XR device for wireless communication is described. The XR device may include means for performing an initialization procedure with a UE including a time synchronization and a frequency synchronization between the UE and the XR device, means for transmitting, to the UE and at a first periodicity, one or more first pilot signals, means for receiving, based on transmitting the one or more first pilot signals, a first control message indicating a first set of correction factors to apply to at least one of the time synchronization or the frequency synchronization between the UE and the XR device, means for receiving, from the UE and at a second periodicity, a second pilot signal, means for transmitting, to the UE, a second control message including one or more time domain samples of the second pilot signal, and means for receiving, based on the one or more time domain samples, a third control message indicating a second set of correction factors to apply to the time synchronization between the UE and the XR device.

A non-transitory computer-readable medium storing code for wireless communication is described. The code may include instructions executable by one or more processors to perform an initialization procedure with a UE including a time synchronization and a frequency synchronization between the UE and the XR device, transmit, to the UE and at a first periodicity, one or more first pilot signals, receive, based on transmitting the one or more first pilot signals, a first control message indicating a first set of correction factors to apply to at least one of the time synchronization or the frequency synchronization between the UE and the XR device, receive, from the UE and at a second periodicity, a second pilot signal, transmit, to the UE, a second control message including one or more time domain samples of the second pilot signal, and receive, based on the one or more time domain samples, a third control message indicating a second set of correction factors to apply to the time synchronization between the UE and the XR device.

In some examples of the method, XR devices, and non-transitory computer-readable medium described herein, receiving the second pilot signal may include operations, features, means, or instructions for receiving a synchronization loop indication message indicating a transmission of the second pilot signal.

In some examples of the method, XR devices, and non-transitory computer-readable medium described herein, the first set of correction factors includes a PPM error or one or more frequency offsets to apply to at least one of the time synchronization or the frequency synchronization between the UE and the XR device.

Some examples of the method, XR devices, and non-transitory computer-readable medium described herein may further include operations, features, means, or instructions for applying at least one of the PPM error or the one or more frequency offsets to at least one of an oscillator, a synthesizer, a phase lock loop (PLL), a counter, a clock, or a resampling component of the XR device.

In some examples of the method, XR devices, and non-transitory computer-readable medium described herein, the second set of correction factors includes a timing offset to apply to the time synchronization between the UE and the XR device.

Some examples of the method, XR devices, and non-transitory computer-readable medium described herein may further include operations, features, means, or instructions for applying the timing offset to at least one of an oscillator, a synthesizer, a PLL, a counter, a clock, or a resampling component of the XR device.

Some examples of the method, XR devices, and non-transitory computer-readable medium described herein may further include operations, features, means, or instructions for receiving, based on a channel propagation delay associated with transmitting the one or more first pilot signals, an indication of one or more time advance values to apply to the time synchronization between the UE and the XR device, where the one or more time advance values may be different from the first set of correction factors.

In some examples of the method, XR devices, and non-transitory computer-readable medium described herein, a quantity of the one or more first pilot signals may be based on a SNR associated with the wireless communication between the UE and the XR device.

Some examples of the method, XR devices, and non-transitory computer-readable medium described herein may further include operations, features, means, or instructions for receiving, from the XR device, an indication of the first periodicity and the second periodicity, where the second periodicity may be less than the first periodicity.

In some examples of the method, XR devices, and non-transitory computer-readable medium described herein, the one or more first pilot signals or the second pilot signal correspond to least one of an SSB, an SSS, a TRS, a PTRS, a DMRS, or a combination thereof.

In some examples of the method, XR devices, and non-transitory computer-readable medium described herein, the first control message, the second control message, or the third control message may be communicated via SCI Format 1.

BRIEF DESCRIPTION OF THE DRAWINGS

FIGS. 13 through 19 show flowcharts illustrating methods that support XR device synchronization management in accordance with one or more aspects of the present disclosure.

DETAILED DESCRIPTION

Figure 1:
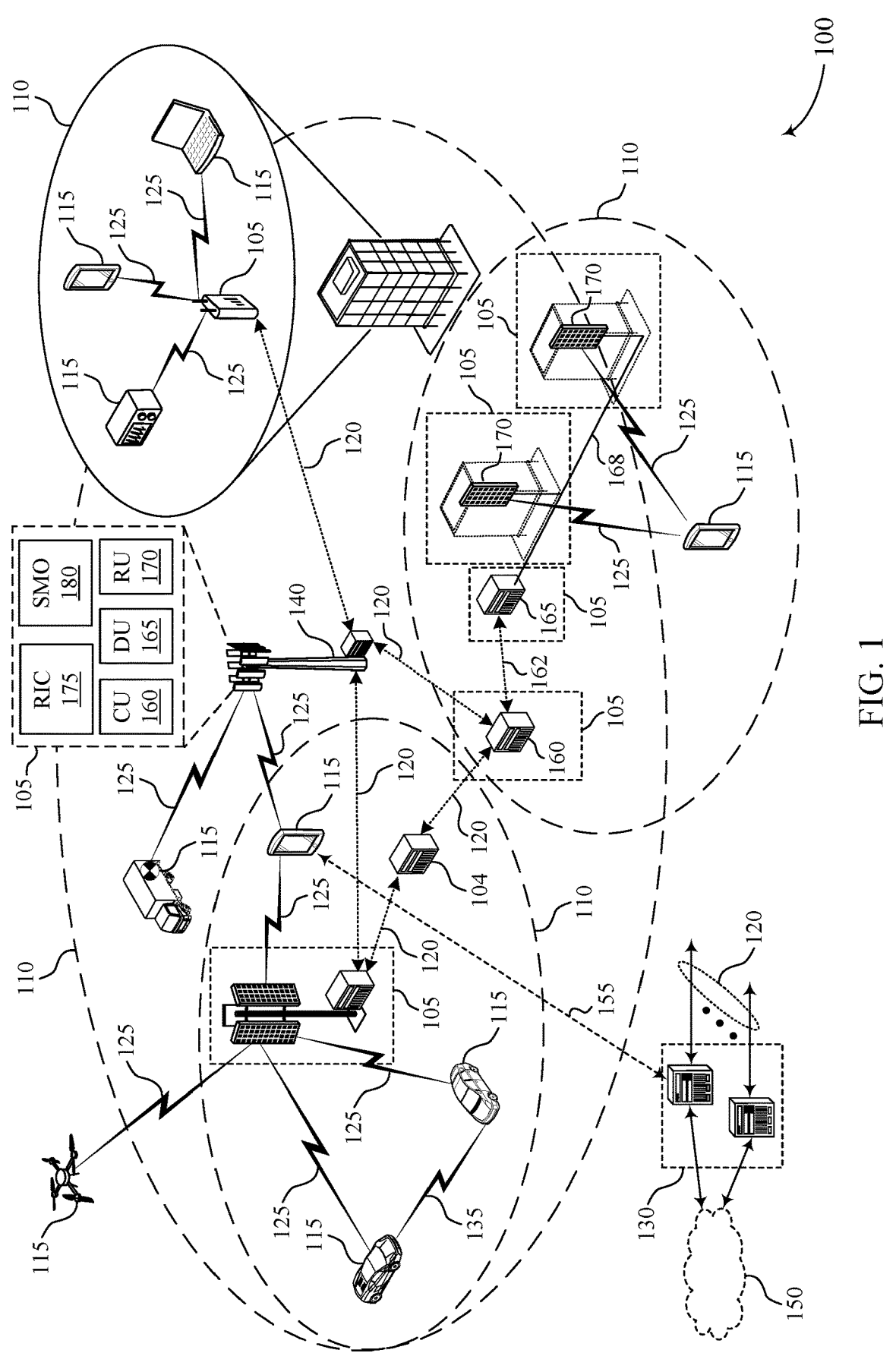
FIG. 1 shows an example of a wireless communications system that supports extended reality (XR) device synchronization management in accordance with one or more aspects of the present disclosure.

An extended reality (XR) device may be implemented in glasses, goggles, or other head mounted or wearable devices. In some cases (e.g., to improve form factor of the wearable XR device), the XR device may be designed to be lightweight and to have a small surface area, among other design considerations. However, such design considerations may reduce a processing power, memory capacity, or battery capacity of the XR. Accordingly, to reduce processing at the XR device while maintaining support of high complexity XR applications, processing associated with XR applications may be shifted to a tethered, short-range companion device, which may be a user equipment (UE). However, many processing components may still be left at the XR device to support end-to-end communication with the companion UE, including time and frequency synchronization. For example, the XR device may use synchronization loops, or may perform estimation of center frequency offset (CFO) or sampling timing offset (STO), to maintain coherent reception and alignment with the UE in frequency and time domains, which may use a significant amount of processing power and computing resources.

In accordance with examples described herein, the XR device and the companion UE may support offloading time and frequency synchronization loops (e.g., management and/or processing of such loops) and STO/CFO estimation from the XR device to the UE. For example, the UE may periodically monitor synchronization between the UE and the XR device using measurements of transmitted pilot signals and may indicate corrections (e.g., frequency corrections, timing corrections) to the XR device based on the measurements. The UE may, in a primary loop, receive an uplink pilot from the XR device, measure a CFO (e.g., parts per million (PPM) error) based on the received pilot, and transmit one or more frequency and/or timing correction factors to be applied by the XR device. In a secondary loop, the UE may transmit a downlink pilot to the XR device and may receive, from the XR device, time samples of the downlink pilot as received by the XR device. Based on the time samples, the UE may measure an STO (e.g., residual STO after applying the correction factors) and may transmit one or more additional timing correction factors to be applied by the XR device. This process may be periodically repeated during the UE-XR communication life cycle.

By initiating and performing time and frequency synchronization loops at the UE (rather than at the XR device), the UE may support reduced processing at the XR device. For example, the XR device may refrain from performing measurements of CFO and/or STO, among other measurements and estimations associated with time and frequency synchronization procedures, which may reduce processing power at the XR device. Such techniques may support an improved form factor, a reduced power consumption, or an improved battery life of the XR device, for example, because the XR device may include fewer or smaller components (e.g., by offloading sensing and/or processing associated with time and frequency synchronization). Such techniques may improve performance of wireless communication systems by increasing spectral efficiency, increasing coordination between devices, increasing signal strength, and decreasing power consumption, among other benefits.

Aspects of the disclosure are initially described in the context of wireless communications systems. Aspects of the disclosure are further described in the context of system architectures and process flows. Aspects of the disclosure are further illustrated by and described with reference to apparatus diagrams, system diagrams, and flowcharts that relate to XR device synchronization management.

FIG. 1 shows an example of a wireless communications system 100 that supports XR device synchronization management in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support XR device synchronization management as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Some UEs 115 may be XR devices that support XR data communications. XR data may include virtual reality (VR), augmented reality (AR), and/or mixed reality (MR) data. In some examples, transmissions to an XR device may be downlink or sidelink transmissions from a companion device (e.g., a UE 115), which may include video frame data transmissions for projection to a user of the XR device.

In some examples, a UE 115 may perform an initialization procedure with an XR device including a time synchronization and a frequency synchronization between the UE and the XR device. The UE 115 may receive, from the XR device and at a first periodicity, one or more first pilot signals, and may transmit, based on receiving the one or more first pilot signals, a first control message indicating a first set of correction factors to apply to at least one of the time synchronization or the frequency synchronization. The UE 115 may transmit, to the XR device and at a second periodicity, a second pilot signal, and may receive, from the XR device, a second control message including one or more time domain samples of the second pilot signal. The UE 115 may transmit, based on the one or more time domain samples, a third control message indicating a second set of correction factors to apply to the time synchronization between the UE and the XR device.

Figure 2:
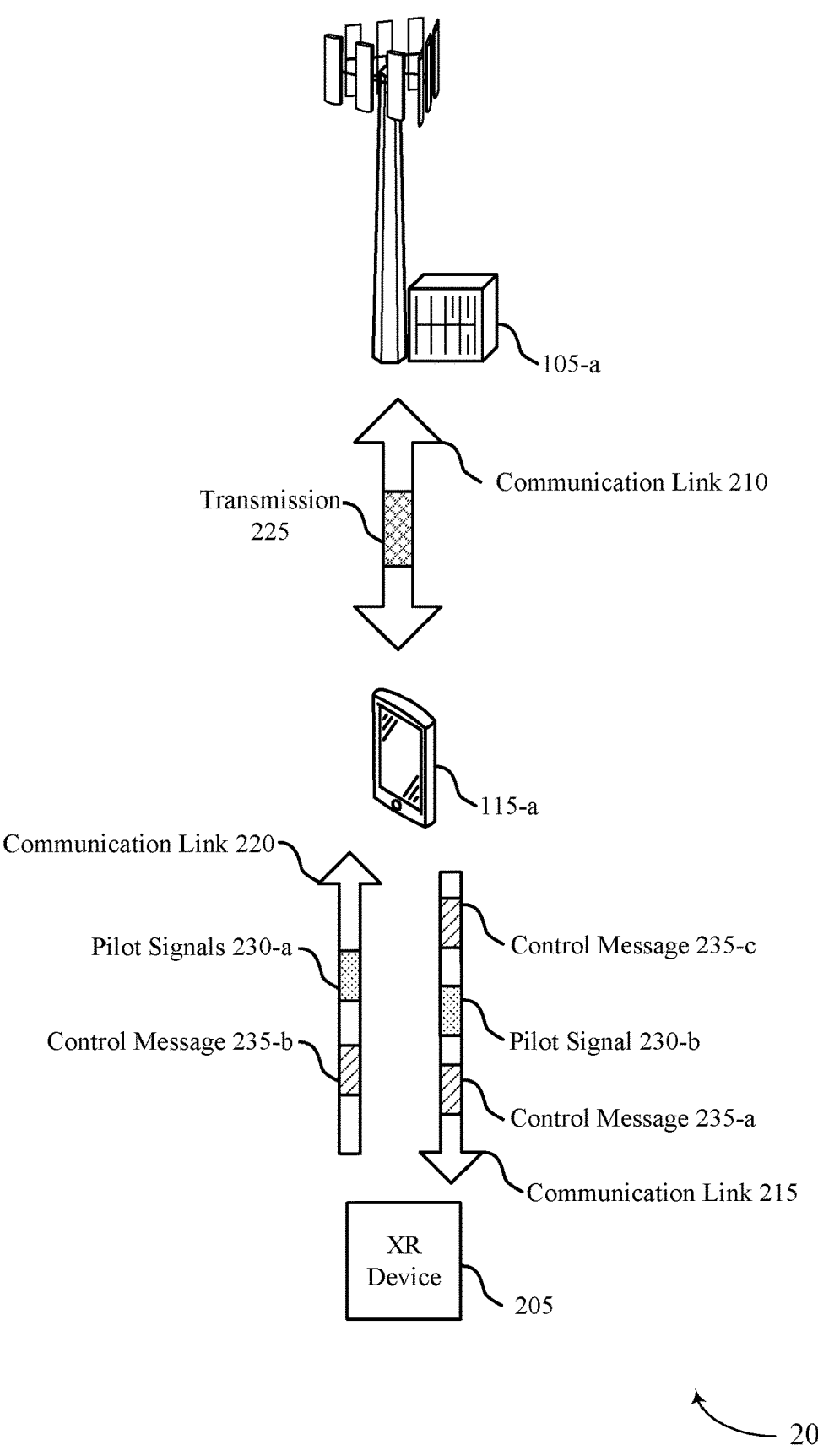
FIG. 2 shows an example of a wireless communications system that supports XR device synchronization management in accordance with one or more aspects of the present disclosure.

FIG. 2 shows an example of a wireless communications system 200 that supports XR device synchronization management in accordance with one or more aspects of the present disclosure. The wireless communications system 200 may implement or may be implemented by aspects of the wireless communications system 100. For example, the wireless communications system 200 may include a UE 115-*a* and a network entity 105-*a*, which may be examples of the corresponding devices as described with reference to FIG. 1.

In some wireless communications systems, a UE 115-*a* may communicate with a network entity 105-*a* via a communication link 210. For example, the UE 115-*a* may receive downlink transmissions 225 from the network entity 105-*a* and transmit uplink transmissions 225 to the network entity 105-*a* via the communication link 210. In some examples, the communication link 210 may be an uplink or downlink channel (e.g., a 5G uplink or downlink channel). The UE 115-*a* may communicate data with an edge device (e.g., a cloud server) via the network entity 105-*a*. The UE 115-*a* may additionally, or alternatively, communicate with an XR device 205 (XR glasses, goggles, etc.) via a communication link 215 and a communication link 220. For example, the UE 115-*a* may receive transmissions from the XR device 205 via the communication link 220, and may transmit transmissions to the XR device 205 via the communication link 215. The communication link 220 and the communication link 215 may be examples of 5G sidelink channels or Wi-Fi links.

In some examples, the XR device 205 may have weight, processing, power consumption, or heat dissipation constraints or limitations (e.g., to allow for long-time or on-the-go use by a user of the XR device 205). For example, the XR device 205 may have a weight similar to non-XR glasses (e.g., about 30-40 grams), and may accordingly include light weight components, such as light weight batteries. Further, a heat dissipation ability of the XR device 205 may be proportional to a surface area of the XR device 205. Thus, the XR device may have a relatively smaller heat dissipation ability as compared to other UEs 115, which may have a larger surface area than the XR device 205. In some examples, a power consumption limit associated with the heat dissipation ability of the XR device 205 may be smaller than for the other UEs 115 (e.g., a limit of between 1.5 and 3 Watts). Accordingly, to reduce heat generation and power consumption, the XR device 205 may operate with a limited processing complexity, which may allow for a lighter weight XR device 205 and a longer battery lifetime.

However, some XR devices 205 (e.g., higher form factor head mounted device (HMD) XR devices 205) may support many XR applications, and may be used for specific applications (e.g., static and short time usage scenarios). That is, HMD devices may allow for higher processing complexity, but may be inconvenient for longer time usage or mobile scenarios.

Accordingly, to allow for reduced processing complexity associated with smaller and lighter weight XR devices 205, some XR-related processing may be shifted to (performed by) a companion device such as the UE 115-*a*, which may be referred to as a split XR approach. In some split XR approaches, the UE 115-*a* may perform rendering-related processes (e.g., video rendering), while the XR device 205 may include processing components for different edge-to-edge (E2E) considerations (e.g., photo-to-motion latency considerations, XR to companion device wireless link capacity, communication link power consumption for long range links). Thus, the power consumption involved in such split XR approaches may exceed the power consumption limit of the XR device 205 even in less demanding or lower complexity scenarios. Further, such split XR approaches may not be capable of supporting demanding or premium XR applications (e.g., greater than 120 frames per second (fps), 8K high-resolution video formats).

For example, some split XR approaches may use long range communication links over a licensed spectrum shared with multiple served XR users. However, such approaches may involve tight scheduling and staggering, and may result in a limited capacity per XR user. Accordingly, the XR device 205 may include one or more sensors which may perform local data processing (e.g., to reduce a volume of data such as 6 degree of freedom (DOF) tracking, eye tracking for field of view (FOV) derivation, etc. transmitted to the companion device). Further, additional data transmitted from the XR device 205 to the companion device (e.g., sensor and camera data) and from the companion device to the XR device 205 (e.g., rendered video data) may be compressed with a high compression factor to achieve a link capacity threshold per XR user. Such data pre-processing and video compression with a sufficiently high compression factor (e.g., high profile of H264) may involve a high processing complexity for an encoding device. Further, such techniques may involve a high double data rate (DDR) usage for transmission and reception path video processing, which may result in increased power consumption by the XR device 205. Additionally, to account for latencies such as photon-to-motion latency and network entity-based split latencies, the XR device 205 may apply asynchronous time wrapping (ATW) as part of receiver-side processing for last moment image alignment with a pose associated with the user. Accordingly, such techniques may result in power consumption which exceeds the power consumption limit (e.g., greater than 3 Watts).

Some other split XR approaches may use processing offloading techniques. For example, the XR device 205 may have a tethering link (e.g., the communication link 215, the communication link 220) with the companion device (e.g., the UE 115-*a*) which may be shorter than the long range communication links. Such approaches may involve a similar processing load as the long range communication link techniques, but may reduce modem-related power consumption as compared to the long range communication link techniques. However, such approaches may result in power consumption which exceeds the power consumption limit.

Some techniques may allow for more processing offloading from the XR device 205 to the UE 115-*a* (e.g., and the network entity 105-*a*) such that the XR device 205 may operate as a mostly input/output (I/O) device. For example, the XR device 205 may share local sensor information with the UE 115-*a* without performing pre-processing, and may receive rendered video from the UE 115-*a* to be displayed to the user without any post-processing. Such techniques may allow for the XR device 205 to significantly reduce power consumption as compared to other split XR approaches (e.g., by about 50%), which may allow for lower power and lighter weight XR devices 205 (e.g., which may achieve target XR characteristics or key performance indicator (KPI) thresholds).

To allow for the XR device 205 to operate as a mostly I/O device, as described herein, complexity associated with the XR device 205 transmitting or receiving signaling (e.g., including PHY layer or modem related complexity) may be shifted to (performed by) the UE 115-*a*. In some examples, the modem complexity may result from receiver-side processing. Accordingly, receiver PHY modules at the XR device 205 may be effectively shifted to the transmission side of the communication link 215 at the UE 115-*a* (e.g., and thus degenerated at the XR device 205). Thus, the XR device 205 may operate with reduced processing by the XR mode, and may accordingly achieve a reduced processing complexity and power consumption. To perform such techniques, the UE 115-*a* may have a quasi-continuous channel state information (CSI) knowledge for the channel (e.g., with or without channel reciprocity), which may be achieved using transmission schemes such as low latency time division duplex (TDD), full duplex, or subband full duplex (SBFD). In some examples, full duplex schemes may be implemented for low power, short range communication links such as the communication link 215 and the communication link 220 relatively easier than for ultra-wideband (UWB) links.

In some examples, the XR device 205 may use (e.g., initiate, manage) synchronization loops to maintain coherent reception and alignment with a transmitting device (e.g., the UE 115-*a*) on frequency and timing grids. However, to manage the synchronization loops, the XR device 205 may be associated with a high (e.g., non-negligible) design complexity or may include a large quantity of computing resources (e.g., to support a large computing capacity). For example, the XR device may continuously estimate time and frequency offsets (e.g., drifts), may process or filter the offsets based on previous measurements the XR device performs, and may apply appropriate corrections to a time or frequency synchronization between the UE 115-*a* and the XR device 205.

In accordance with examples described herein, the XR device 205 and the UE 115-*a* may support a reduced complexity at the XR device 205 by removing time and frequency synchronization loops and STO/CFO estimation related functionality from the XR device 205. For example, the UE 115-*a* (e.g., a companion device of the XR device 205) may perform time and frequency corrections for the XR device 205 and may perform tracking of a time and frequency synchronization (e.g., via management of time and frequency synchronization loops) between the UE 115-*a* and the XR device 205.

The UE 115-*a* and the XR device 205 may perform an initial acquisition procedure that may enable the UE 115-*a* and the XR device 205 to obtain an initial uplink and downlink time and frequency synchronization. The initial acquisition procedure may occur at the beginning of the connection session or pairing between the XR device 205 and the UE 115-*a* (e.g., companion UE). The UE 115-*a* and the XR device 205 may use the initial acquisition procedure to establish the communication link 215 (e.g., for downlink) and the communication link 220 (e.g., for uplink).

The UE 115-*a* may use a first synchronization loop (e.g., primary synchronization loop) to track (e.g., estimate) a frequency synchronization (e.g., CFO) or a PPM error associated with the XR device 205 and perform corrections of the frequency synchronization. The UE 115-*a* and the XR device 205 may perform (e.g., transmit or receive signals of, perform processes of) the first synchronization loop at a first periodicity. During (e.g., at the start of) the first synchronization loop, the XR device 205 may transmit one or more pilot signals 230-*a*. The UE 115-*a* may receive the one or more pilot signals 230-*a*, which may enable the UE 115-*a* to measure or estimate one or more offsets (e.g., CFO, STO) associated with the XR device 205. Based on the one or more offsets, the UE 115-*a* may determine (e.g., calculate) a PPM error associated with the XR device 205. For example, one or more of local oscillators, frequency sources, digital clocks, numerically controlled oscillators, sampling rates, resampling functionality, or counters/timers at the XR device 205 may share a same clock reference, and the clock reference may be associated with the PPM error. Thus, the PPM error may be reflected in one or more measurements associated with the XR device (e.g., frequency offsets, sampling rate mismatches, time offsets (e.g., drifts), counter mismatches, or other measurements), and the UE 115-*a* may determine the PPM error based on the one or more measurements.

The PPM error associated with the XR device 205 may enable the companion UE 115-*a* to perform tracking and management of time and synchronization between the UE 115-*a* and the XR device 205. For example, the PPM error may enable the companion UE 115-*a* to determine a proper frequency correction or a frequency error for any targeted carrier frequency which may be different in some cases from transmission to transmission (e.g., with frequency hopping across UWB bandwidth/channels/subbands). In some cases, the PPM error may enable the UE 115-*a* to correct any local XR device phase lock loop (PLL), numerically controlled oscillator (NCO), clock synthesizer, RF frequency source output, sampling rate or clock (e.g., for any analog-to-digital (ADC) or digital-to-analog (DAC) converter), or resampling functionality (e.g., to mitigate sampling mismatches and time drifts) of the XR device 205. The PPM error may enable the UE 115-*a* to adjust a digital counter or clock synthesizer of the XR device 205.

Based on receiving the one or more pilot signals 230-*a* (e.g., or CFO/PPM error estimation), the UE 115-*a* may transmit a control message 235-*a* that indicates a first set of correction factors to apply to at least one of the time synchronization or the frequency synchronization between the UE 115-*a* and the XR device 205. For static channels (e.g., XR applications), the UE 115-*a* may determine the PPM error associated with the XR device based on an estimated CFO of the XR device 205 and may indicate the PPM error via the control message 235-*a*. Additionally, or alternatively, the UE 115-*a* may indicate a loop filter frequency offset (e.g., loop filter output) or an averaged correction (e.g., averaging output), and the XR device 205 may determine (e.g., calculate) the PPM error locally at the XR device 205.

The UE 115-*a* may use a second synchronization loop (e.g., secondary synchronization loop) to track (e.g., estimate) a time synchronization (e.g., STO) of the XR device

205 and perform corrections of the time synchronization. The UE 115-*a* and the XR device 205 may perform (e.g., transmit or receive signals of, perform processes of) the secondary synchronization loop at a second periodicity. During (e.g., at the start of) the second synchronization loop, the UE 115-*a* may transmit a pilot signal 230-*b* to the XR device 205. In some cases, the UE 115-*a* may transmit a synchronization loop indication message to indicate the transmission of the pilot signal 230-*b*, to trigger the start of the second synchronization loop, or both. The XR device 205 may sample (e.g., using time domain sampling, frequency domain sampling) the pilot signal 230-*b*, or some data portion of the pilot signal 230-*b*, and the XR device 205 may transmit, to the UE 115-*a*, a control message 235-*b* that includes one or more samples (e.g., time domain samples, frequency domain samples) of the pilot signal 230-*b*. The UE 115-*a* may measure or estimate an STO for the XR device 205 based on receiving the control message 235-*b*. Based on the one or more samples (e.g., and/or STO estimation), the UE 115-*a* may transmit a control message 235-*c* that indicates a second set of correction factors to apply to the time synchronization between the UE 115-*a* and the XR device 205, for example, to correct time delays or drifts resulting from any residual non corrected PPM error.

The UE 115-*a* and the XR device 205 may perform the second synchronization loop at a second periodicity (e.g., timing loop update rate). In some cases, because the UE to XR link (e.g., the communication link 215, the communication link 220) may be associated with a low or negligible mobility (e.g., low latency link) and because an accuracy associated with the primary synchronization loop (e.g., PPM error tracking, quasi-continuous CFO measurement) may be high (e.g., may satisfy a threshold), the second periodicity may be less than the first periodicity. In some cases, the UE 115-*a* may transmit the synchronization loop indication message at a lower periodicity relative to a periodicity for the XR device 205 transmitting the one or more pilot signals 230-*a* (e.g., which may trigger, or occur at, the start of the primary synchronization loop). In some examples, loop filters for the XR loops may be continuously updated at the UE 115-*a*.

The UE to XR link may be associated with one of a TDD with a low latency pattern for uplink and downlink, a single frequency full duplex (SFFD), or an SBFD, and a quasi-continuous CFO measurement for the XR device 205 may allow for an increased loop processing gain and a reduced loop update latency (e.g., first periodicity, second periodicity) while supporting a high accuracy PPM error estimation for the XR device 205. Accordingly, the PPM error may not be dependent on a band/channel central frequency or may not be dependent on the direction of transmission being uplink or downlink because the UE to XR link may be nearly static (e.g., non-mobile) over UWB (e.g., with negligible Doppler shifts). The PPM error may be applicable for correction of loops, local oscillators, sampling rates, clocks, and counters of the XR device 205 for both uplink and downlink. The UE 115-*a* may use the PPM error for corrections at the XR device 205 for scenarios with or without channel reciprocity in uplink and downlink and for any duplex design or configuration for the UE to XR link.

The first periodicity and the second periodicity may indicate a refresh rate of the loops or a refresh rate of the correction factors indication (e.g., output of loops/averaging) from the UE 115-*a*. In some examples, the first periodicity and the second periodicity, or any other conditions or parameters for triggering (e.g., starting) or performing the primary synchronization loop or the secondary synchronization loop, may be based on decoding statistics. For example, the UE 115-*a* and the XR device 205 may start (e.g., enter) or perform either of the primary synchronization loop or the secondary synchronization loop based on a trigger event, such as a quality of the communication link 220 or the communication link 215 dropping below a threshold (e.g., link deterioration or degeneration). The UE 115-*a* may indicate (e.g., preconfigure) the first periodicity and the second periodicity, or any other conditions or parameters for triggering the primary synchronization loop or the secondary synchronization loop, to the XR device 205 via RRC signaling, MAC-control element (MAC-CE) signaling, or any other signaling the UE 115-*a* uses to preconfigure the XR device 205.

In some cases, the first periodicity, the second periodicity, or both may be based on a signal to noise ratio (SNR) associated with the communication link 220 or the communication link 215. For example, the first periodicity or the second periodicity may be relatively higher for a low SNR. That is, for low SNR, the UE 115-*a* may average multiple measurements to obtain estimations (e.g., perform corrections) for the time and frequency synchronization. In other examples, the first periodicity or the second periodicity may be relatively lower for a high SNR. That is, for high SNR, the UE 115-*a* may use a single measurement (e.g., or relatively fewer measurements compared with low SNR) to obtain estimations (e.g., perform corrections) for the time and frequency synchronization.

In some examples, in addition to performing the first and second synchronization loops, the UE 115-*a* (e.g., companion device) may perform time advance signaling to manage (e.g., track, monitor, correct) uplink transmission timing for the XR device 205. The UE 115-*a* may perform measurements associated with the communication link 220 (e.g., uplink) at a receive-side of the UE 115-*a*, and the time advance signaling (e.g., correction) may be based on the measurements and may apply to the communication link 220. Such a procedure for time advance may be similar to an uplink timing alignment for the communication link 210 between the UE 115-*a* and the network entity 105-*a*, where the UE 115-*a* may be a transmitting device and the network entity 105-*a* may be a receiving device. The UE 115-*a* may use the time advance signaling to correct or monitor a channel propagation delay associated with the XR device. For example, the UE 115-*a* may transmit, based on a channel propagation delay associated with receiving one or more signals from the XR device 205 (e.g., the one or more pilot signals 230-*a*), an indication of one or more time advance values to apply to the time synchronization between the UE 115-*a* and the XR device 205. The one or more time advance values may be different from the first set of correction factors and the second set of correction factors.

Figure 3:
FIG. 3 shows an example of a system architecture that supports XR device synchronization management in accordance with one or more aspects of the present disclosure.

FIG. 3 shows an example of a system architecture 300 that supports XR device synchronization management in accordance with one or more aspects of the present disclosure. The system architecture 300 may implement or may be implemented by aspects of the wireless communications system 100 or the wireless communications system 200. For example, the system architecture 300 may include a UE 115-*b* and an XR device 305, which may be examples of a UE 115 and an XR device 205, respectively, as described with reference to FIGS. 1 and 2.

To allow for the XR device 305 to operate as a mostly I/O device, as described herein, complexity associated with the XR device 305 transmitting or receiving signaling (e.g., including PHY layer or modem related complexity) may be shifted to (performed by) the UE 115-*b*. In some examples, the modem complexity may result from receiver-side processing (e.g., base band receiver-side processing). Accordingly, receiver PHY modules at the XR device 305 may be effectively shifted to the transmission side of a communication link at the UE 115-*b* (e.g., and thus degenerated at the XR device 305). Thus, the XR device 305 may operate with reduced processing by the XR mode, and may accordingly achieve a reduced processing complexity and power consumption. In some examples, continuous uplink and downlink channels (e.g., associated with the communication link 220 and the communication link 215, respectively) may enable the shifting of the receiver PHY modules at the XR device 305 to the companion UE 115-*b*. The continuous uplink and downlink channels may be associated with a low latency TDD pattern, full duplex, SBFD, FDD, or any combination thereof.

In some examples, a fast Fourier transform (FFT) complexity (e.g., and any receiver PHY modules associated with FFT) may be absent from the XR device 205. For example, the UE 115-*b* may transmit signals to the XR device 205 via DFT-s-OFDM, and the XR device 205 may refrain from performing some (e.g., any) FFT operations. Accordingly, the XR device 205 may process data symbols on the receive-side via a time domain (e.g., as opposed to a frequency domain). In some cases, the XR device 305 may assume an FFT and DFT of a same size, or may assume that no other XR devices are multiplexing in the frequency domain on a same component carrier or UWB subchannel. In some examples, the XR device 305 may perform partial CSI measurements via the frequency domain. For example, the XR device 305 may perform channel sampling in the frequency domain for a CSI indication from the XR device 305 to the UE 115-*b*.

The XR device 305 may lack PHY modules associated with STO or CFO estimation. Instead, the UE 115-*b* at the transmitter-side may include a STO/CFO estimation component 315. For example, the UE 115-*b* may, via the STO/CFO estimation component 315, perform CFO and STO estimation for the XR device 305 (e.g., thereby shifting CFO/STO estimation from receiver-side to transmit-side). The UE 115-*b* may also include a synchronization loop management component 320, which the UE 115-*b* may use to perform synchronization loop management for the XR device 305 (e.g., thereby shifting synchronization loop management from receiver-side to transmit-side). Using the synchronization loop management component 320 or the STO/CFO estimation component 315, or a combination thereof, the UE 115-*b* may transmit correction updates to the XR device 305 (e.g., paired device), and the XR device 305 may apply the correction updates locally.

In some examples, the UE 115-*b* may include a channel estimation component 325, which may perform channel estimation for the XR device 305 (e.g., thereby shifting channel estimation from receive-side to transmit-side). In cases of non-reciprocal channels (e.g., FDD, SBFD), the XR device 305 may include the channel sampling component 335, and channel estimation may be distributed between the XR device 305 at the receive-side, and the UE 115-*b* at the transmit-side. In such cases, the XR device 305 may use the channel estimation component 325 to indicate samples to the UE 115-*b*. In cases of reciprocal channels (e.g., full duplex, TDD), the XR device 305 may not include the channel sampling component 335, and the channel estimation component 325 at the UE 115-*b* may perform channel estimation for the XR device 305 (e.g., without sampling at the XR device 305).

The XR device 305 may include a noise estimation component 340. The XR device 305 may utilize the noise estimation component 340 to indicate receiver-side noise statistics (Rnn) or noise variance to the UE 115-b. The UE 115-b may use the indicated Rnn or noise variance from the XR device 305 for transmit precoding. Because the XR device 305 lacks a channel equalization component (e.g., with channel equalization shifted to transmit-side at the UE 115-b), the XR device 305 may be unable to perform channel whitening or interference rejection combining (IRC). The UE 115-b may include a channel equalization component 330 and may perform space-frequency equalization for the XR device 305 (e.g., thereby shifting channel equalization from receive-side to transmit-side). For example, using the channel equalization component 330, the UE 115-b may perform one or more of throughput (THP) calculation, linear transmit-side filtering, precoding, or other channel equalization procedures associated with the XR device 305.

The XR device 305 may include a decoding component 345. The XR device 305 may use a low complexity decoding scheme for decoding signals (e.g., from the UE 115-b), which may reduce a complexity or a processing power associated with the decoding component 345.

Figure 4:
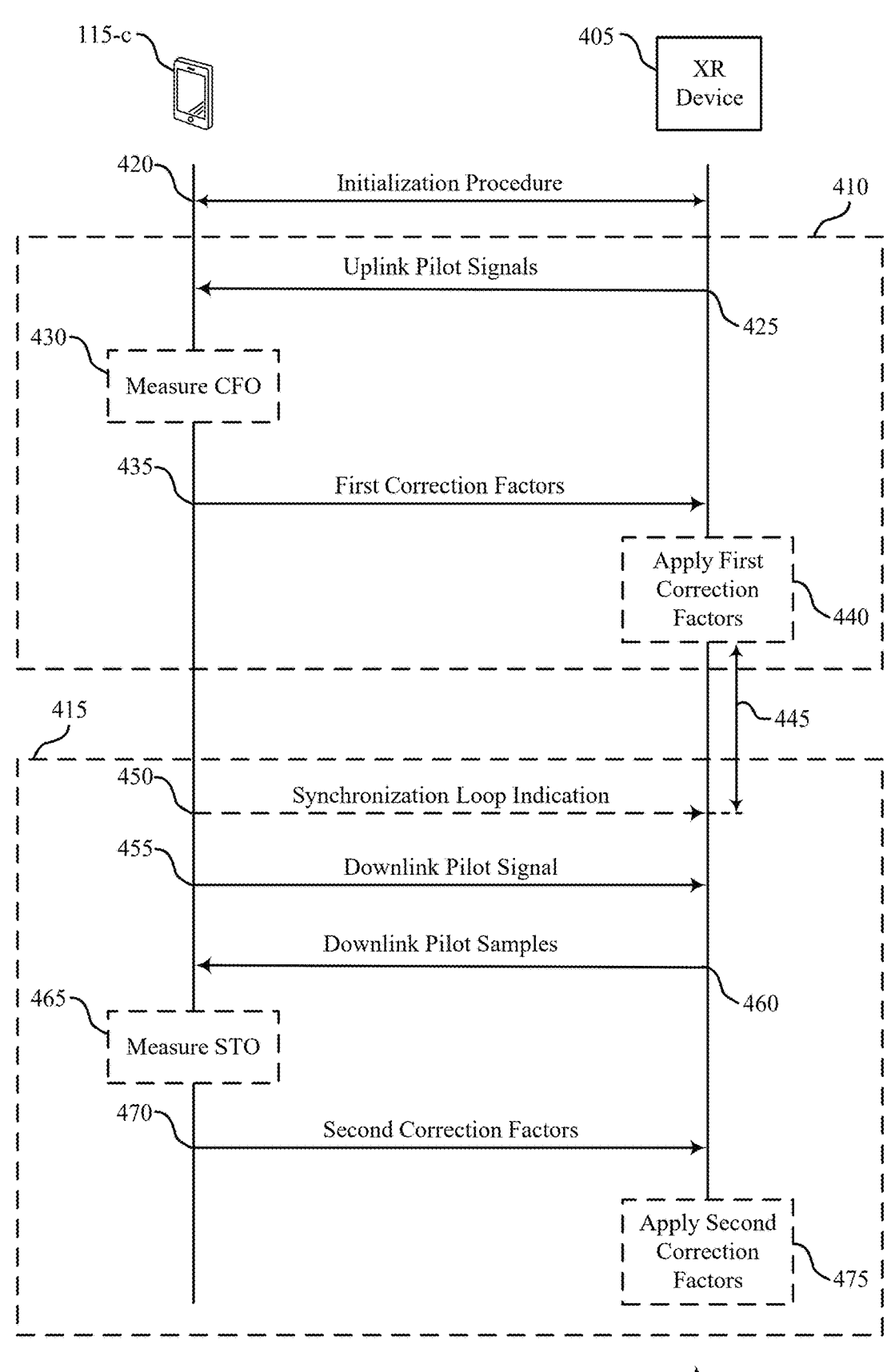
FIG. 4 shows an example of a process flow that supports XR device synchronization management in accordance with one or more aspects of the present disclosure.

FIG. 4 shows an example of a process flow 400 that supports XR device synchronization management in accordance with one or more aspects of the present disclosure. The process flow 400 may implement or may be implemented by aspects of the wireless communications system 100 or the wireless communications system 200. For example, the process flow 400 may include a UE 115-c and an XR device 405, which may be examples of a UE 115 and an XR device 205, respectively, as described with reference to FIGS. 1 and 2. In the following description of the process flow 400, the operations between the UE 115-c and the XR device 405 may be transmitted in a different order than the example order shown, or the operations performed by the UE 115-c and the XR device 405 may be performed in different orders or at different times. Some operations may also be omitted from the process flow 400, and other operations may be added to the process flow 400. The process flow 400 may include a first synchronization loop 410 and a second synchronization loop 415. In some examples, either or both of the first synchronization loop 410 or the second synchronization loop may be repeated (e.g., periodically, based on a first periodicity and a second periodicity, respectively) during a communication life cycle between the UE 115-c and the XR device 405.

At 420, the UE 115-c may perform an initialization (e.g., initialization acknowledgment (ACK)) procedure with the XR device 405 including a time synchronization and a frequency synchronization between the UE 115-c and the XR device 405. The initialization procedure may pair the XR device 405 with the UE 115-c (e.g., companion device of the XR device 405). The initialization procedure may occur at the beginning of the connection session (e.g., pairing) between the XR device 405 and the UE 115-c and may indicate to the XR device 405 a coarse time and frequency synchronization associated with the connection session.

At 425, the UE 115-c may receive, from the XR device 405 and at a first periodicity, one or more first pilot signals (e.g., uplink pilot signals). In some cases, the one or more first pilot signals may trigger a start of a first synchronization loop 410 (e.g., a primary synchronization loop). In some examples, a quantity of the one or more first pilot signals may be based on an SNR associated with the wireless communication between the UE 115-c and the XR device 405. For example, for a relatively lower SNR, the XR device 405 may transmit a greater quantity of first pilot signals compared with for a relatively higher SNR. The one or more first pilot signals may be spread or repeated across time or frequency. The UE 115-c may indicate to the XR device 405, for example, via a configuration, the quantity of pilot signals to transmit. In some examples, the one or more first pilot signals may correspond to at least one of an SSB, a SSS, a TRS, a PTRS, a DMRS, a combination thereof. The one or more first pilot signals may be any other pilot, may be a new pilot, or may be a modified or degenerated version of an existing pilot. The XR device 405 may transmit the one or more first pilot signals via sidelink control information (SCI) (e.g., SCI Format 1 (SCI-1)).

At 430, the UE 115-c may measure a CFO (e.g., quasi-continuous CFO measurement) for the XR device 405 based on receiving the one or more first pilot signals. The UE 115-c may measure the CFO by averaging the one or more first pilot signals or by applying a loop filter to the one or more first pilot signals. In some examples, the UE 115-c may calculate (e.g., estimate, obtain) a PPM error or one or more frequency offsets based on the CFO.

At 435, the UE 115-c may transmit, based on receiving the one or more first pilot signals, a first control message indicating a first set of correction factors to apply to at least one of the time synchronization or the frequency synchronization between the UE 115-c and the XR device 405. The first set of correction factors may include one or more of the CFO, the one or more frequency offsets, or the PPM error. The UE 115-c may indicate to the XR device 405 to apply at least one of the first set of correction factors locally at the XR device 405. The UE 115-c may transmit the first control message via SCI (e.g., SCI-1).

At 440, the XR device 405 may apply at least one of the PPM error or the one or more frequency offsets (e.g., CFO, other frequency offsets) to at least one of an oscillator (e.g., NCO), a synthesizer, a PLL, a counter, a clock, or a resampling component of the XR device 405. In some cases, the XR device 405 may apply at least one of the PPM error or the one or more frequency offsets, or other correction factors of the first set of correction factors, to an NCO module, a resampler module, a PLL/RF frequency synthesizer, a clock synthesizer, or a time counter (e.g., timer). The XR device 405 may apply one or more correction factors of the first set of correction factors in accordance with frequency offset or timing corrections. A duration 445 may correspond to a duration for the one or more correction factors to apply to (e.g., go into effect at) XR device 405. For example, for each correction that is applied on the side of the XR device 405, the UE 115-c may wait (e.g., delay transmitting the synchronization loop indication or a second pilot signal) until the correction is effectively applied at the XR device 405. That is, the UE 115-c may delay at least the duration 445 before a next CFO/STO measurement or before requesting samples (e.g., via the synchronization loop indication) or before transmitting a second pilot signal (e.g., downlink pilot signal) for sampling.

At 450, the UE 115-c may transmit a synchronization loop indication message indicating a transmission of the second pilot signal. In some cases, the synchronization loop indication message may trigger a second synchronization loop 415 (e.g., a secondary synchronization loop). For example, the synchronization loop indication message may indicate a session (e.g., of multiple sessions) of the second synchronization loop 415. In some examples, the synchronization loop indication message may indicate or configure a set of resources associated with transmission of the second pilot signal. The synchronization loop indication message may indicate that transmission of the second pilot signal is periodic, for example, according to a second periodicity, or may indicate that transmission of the second pilot signal is triggered aperiodically (e.g., complementary) by the UE 115-c. The second periodicity may be less (e.g., less frequent) than the first periodicity. The UE 115-c may indicate to the XR device 405 a level of timing loop convergence for the XR device 405 or a rate of feedback from the XR device 405 to the UE 115-c associated with the XR device 405 providing feedback (e.g., sampling) of the second pilot signal. The indication from the UE 115-c may be based on the UE 115-c obtaining STO measurements of the XR device 405, which may enable the UE 115-c to perform time tracking of the XR device 405. The UE 115-c may transmit the synchronization loop indication message via SCI (e.g., SCI-1).

At 455, the UE 115-c may transmit, to the XR device 405 and at the second periodicity, the second pilot signal. In some examples, the UE 115-c may transmit the second pilot signal (e.g., synchronization pilot) periodically from the UE 115-c to the XR device 405 over UWB on preconfigured resources (e.g., indicated by the synchronization loop indication message). In other examples, the UE 115-c may transmit the second pilot signal aperiodically based on a trigger event (e.g., the synchronization loop indication message triggering the second pilot signal). In some examples, the second pilot signal may correspond to at least one of an SSB, a SSS, a TRS, a PTRS, a DMRS, a combination thereof. The second pilot signal may be any other pilot, may be a new pilot, or may be a modified or degenerated version of an existing pilot. The UE 115-c may transmit the second pilot signal via SCI (e.g., SCI-1).

At 460, the UE 115-c may receive, from the XR device 405, a second control message including one or more samples (e.g., time domain samples, frequency domain samples) of the second pilot signal. In some examples, the XR device 405 may sample a subset or a data portion of the second pilot signal, or the XR device 405 may sample the entire second pilot signal. The XR device 405 may perform the sampling in a time domain or in a frequency domain depending on a pilot type and depending on a waveform (e.g., OFDM, DFT-S-OFDM). In some cases, the XR device 405 may perform time domain sampling without performing frequency domain sampling (e.g., without FFT/DFT computation) to support reduced processing at the XR device 405. In some cases, the XR device 405 may perform partial processing on the one or more samples prior to indicating the one or more samples to the UE 115-c. In other cases, the XR device 405 may indicate the one or more samples to the UE 115-c without performing any processing, and the one or more samples may be based on an oscillator (e.g., NCO) of the XR device 405. The XR device 405 may transmit the second control message via SCI (e.g., SCI-1).

At 465, the UE 115-c may measure an STO for the XR device 405 based on receiving the second control message. For example, the UE 115-c may measure the STO by averaging the one or more samples of the second pilot signal or by applying a loop filter to the one or more samples of the second pilot signal. The UE 115-c may perform measurement of the STO for the XR device 405 (e.g., time offset relative to the paired UE 115-c) using a frequency domain or a time domain based estimation method. For example, the UE 115-c may measure a linear slope of the descrambled pilot signal in the frequency domain.

At 470, the UE 115-c may transmit, based on the one or more samples, a third control message indicating a second set of correction factors to apply to the time synchronization between the UE 115-c and the XR device 405. The second set of correction factors may include one or more timing offsets including the STO. The UE 115-c may indicate to the XR device 405 to apply at least one of the second set of correction factors locally at the XR device 405. The UE 115-c may transmit the third control message via SCI (e.g., SCI-1).

At 475, the XR device 405 may apply at least one of the one or more timing offsets (e.g., STO) to at least one of an oscillator (e.g., NCO), a synthesizer, a PLL, a counter, a clock, or a resampling component of the XR device 405. In some cases, the XR device 405 may apply at least one of the one or more timing offsets to an NCO module, a resampler module, a PLL/RF frequency synthesizer, a clock synthesizer, or a time counter (e.g., timer). The XR device 405 may apply the one or more timing offsets to correct a timing of the XR device 405 in accordance with any change in channel propagation delay or accumulated time drift at the XR device 405 (e.g., resulting from any residual non corrected PPM error). Subsequently, the UE 115-c and XR device 405 may communicate (e.g., via sidelink control and data messages) according to the offsets (e.g., frequency offsets, timing offsets) applied by the XR device 405.

Figure 5:
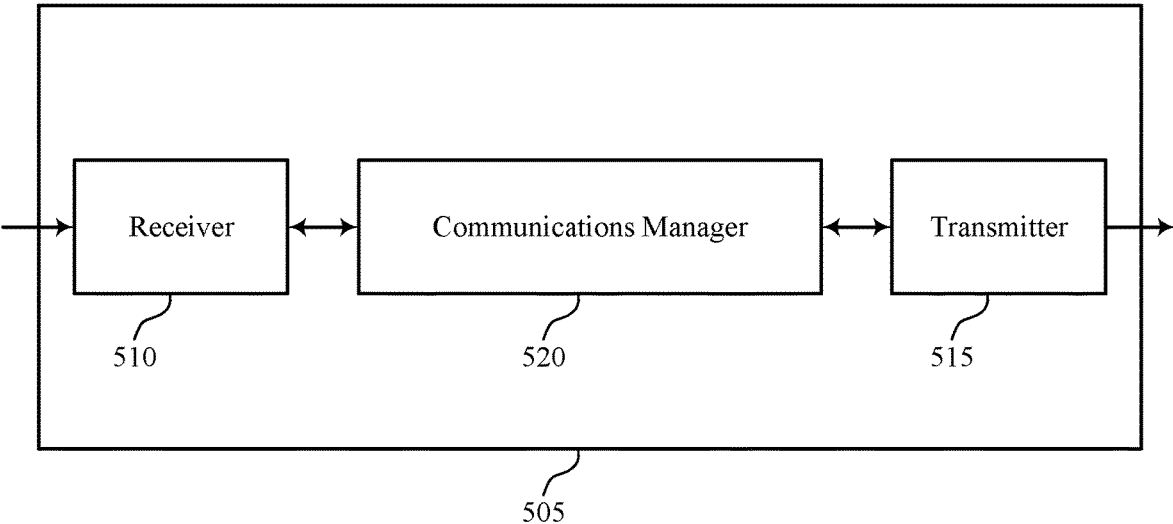
FIGS. 5 and 6 show block diagrams of devices that support XR device synchronization management in accordance with one or more aspects of the present disclosure.

FIG. 5 shows a block diagram 500 of a device 505 that supports XR device synchronization management in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to XR device synchronization management). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to XR device synchronization management). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of XR device synchronization management as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for performing an initialization procedure with an XR device including a time synchronization and a frequency synchronization between the UE and the XR device. The communications manager 520 is capable of, configured to, or operable to support a means for receiving, from the XR device and at a first periodicity, one or more first pilot signals. The communications manager 520 is capable of, configured to, or operable to support a means for transmitting, based on receiving the one or more first pilot signals, a first control message indicating a first set of correction factors to apply to at least one of the time synchronization or the frequency synchronization between the UE and the XR device. The communications manager 520 is capable of, configured to, or operable to support a means for transmitting, to the XR device and at a second periodicity, a second pilot signal. The communications manager 520 is capable of, configured to, or operable to support a means for receiving, from the XR device, a second control message including one or more time domain samples of the second pilot signal. The communications manager 520 is capable of, configured to, or operable to support a means for transmitting, based on the one or more time domain samples, a third control message indicating a second set of correction factors to apply to the time synchronization between the UE and the XR device.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing and reduced power consumption. For example, by shifting functionality related to synchronization loop management from the receive-side (e.g., XR device) to the transmit-side (e.g., companion UE), the described techniques may support reduced processing at the XR device which may support greater functionality and reduced power consumption at the XR device by shifting a portion of the processing load to the companion UE device.

Figure 6:
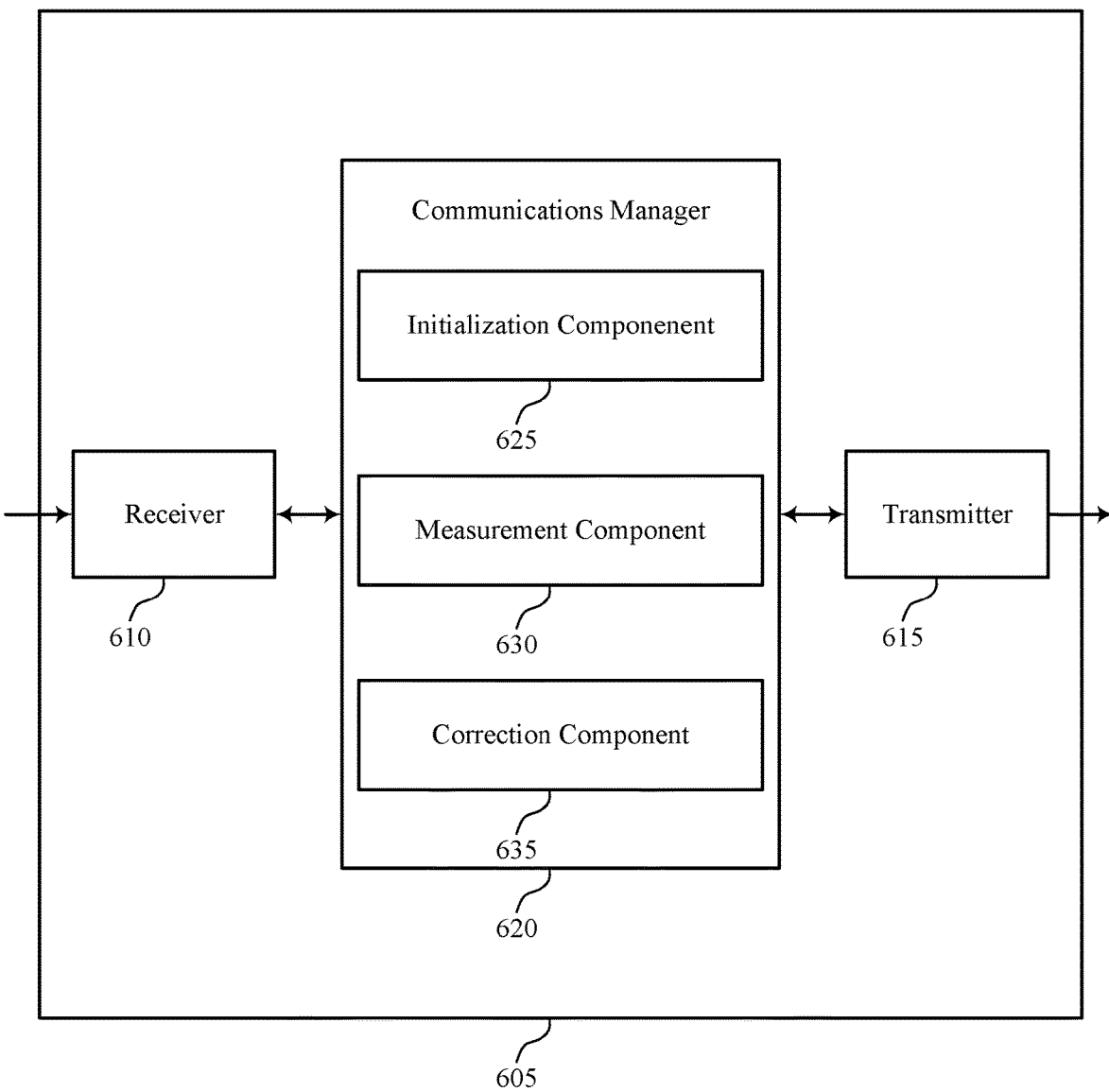

FIG. 6 shows a block diagram 600 of a device 605 that supports XR device synchronization management in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to XR device synchronization management). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to XR device synchronization management). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of XR device synchronization management as described herein. For example, the communications manager 620 may include an initialization component 625, a measurement component 630, a correction component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The initialization component 625 is capable of, configured to, or operable to support a means for performing an initialization procedure with an XR device including a time synchronization and a frequency synchronization between the UE and the XR device. The measurement component 630 is capable of, configured to, or operable to support a means for receiving, from the XR device and at a first periodicity, one or more first pilot signals. The correction component 635 is capable of, configured to, or operable to support a means for transmitting, based on receiving the one or more first pilot signals, a first control message indicating a first set of correction factors to apply to at least one of the time synchronization or the frequency synchronization between the UE and the XR device. The measurement component 630 is capable of, configured to, or operable to support a means for transmitting, to the XR device and at a second periodicity, a second pilot signal. The measurement component 630 is capable of, configured to, or operable to support a means for receiving, from the XR device, a second control message including one or more time domain samples of the second pilot signal. The correction component 635 is capable of, configured to, or operable to support a means for transmitting, based on the one or more time domain samples, a third control message indicating a second set of correction factors to apply to the time synchronization between the UE and the XR device.

Figure 7:
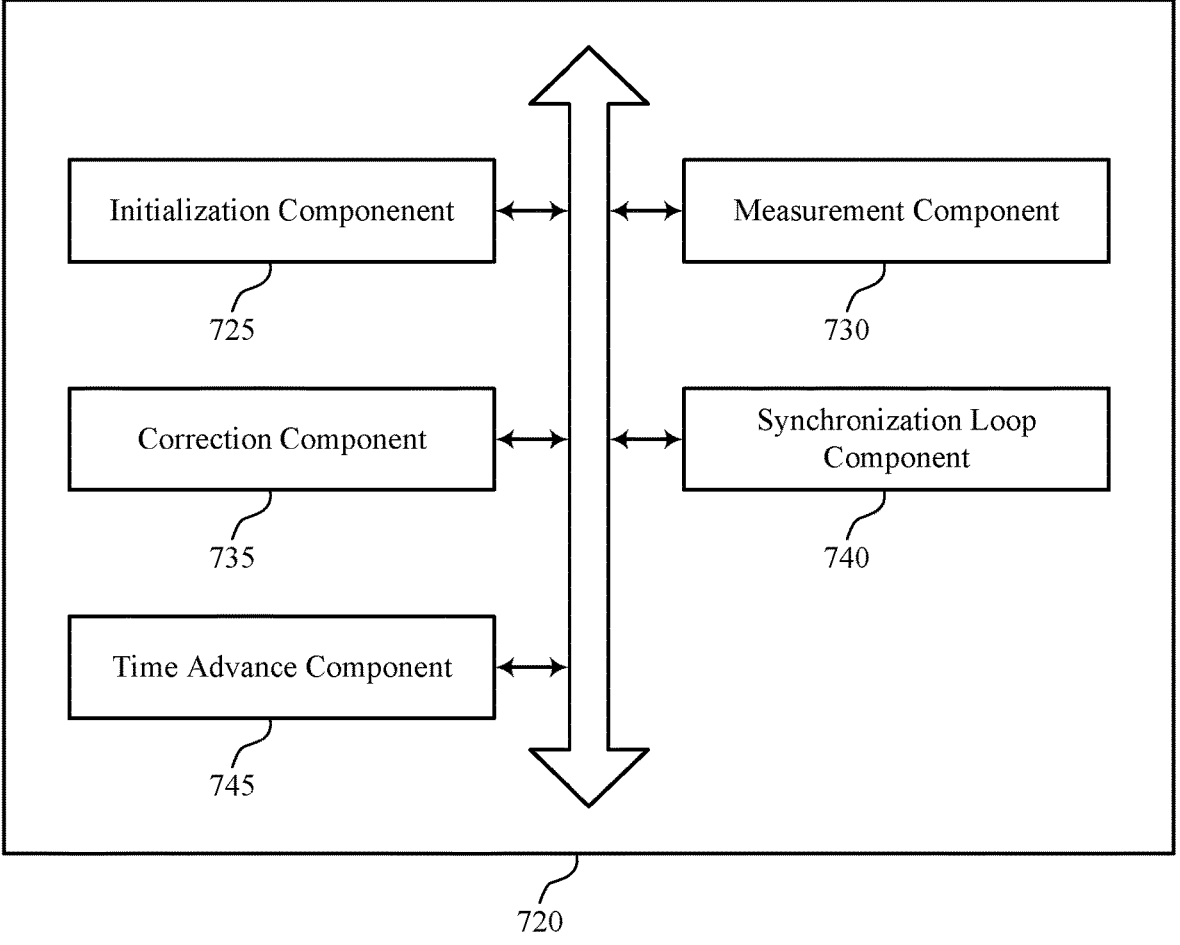
FIG. 7 shows a block diagram of a communications manager that supports XR device synchronization management in accordance with one or more aspects of the present disclosure.

FIG. 7 shows a block diagram 700 of a communications manager 720 that supports XR device synchronization management in accordance with one or more aspects of the present disclosure. The communications manager 720 may be an example of aspects of a communications manager 520, a communications manager 620, or both, as described herein. The communications manager 720, or various components thereof, may be an example of means for performing various aspects of XR device synchronization management as described herein. For example, the communications manager 720 may include an initialization component 725, a measurement component 730, a correction component 735, a synchronization loop component 740, a time advance component 745, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The initialization component 725 is capable of, configured to, or operable to support a means for performing an initialization procedure with an XR device including a time synchronization and a frequency synchronization between the UE and the XR device. The measurement component 730 is capable of, configured to, or operable to support a means for receiving, from the XR device and at a first periodicity, one or more first pilot signals. The correction component 735 is capable of, configured to, or operable to support a means for transmitting, based on receiving the one or more first pilot signals, a first control message indicating a first set of correction factors to apply to at least one of the time synchronization or the frequency synchronization between the UE and the XR device. In some examples, the measurement component 730 is capable of, configured to, or operable to support a means for transmitting, to the XR device and at a second periodicity, a second pilot signal. In some examples, the measurement component 730 is capable of, configured to, or operable to support a means for receiving, from the XR device, a second control message including one or more time domain samples of the second pilot signal. In some examples, the correction component 735 is capable of, configured to, or operable to support a means for transmitting, based on the one or more time domain samples, a third control message indicating a second set of correction factors to apply to the time synchronization between the UE and the XR device.

In some examples, to support transmitting the second pilot signal, the synchronization loop component 740 is capable of, configured to, or operable to support a means for transmitting a synchronization loop indication message indicating a transmission of the second pilot signal.

In some examples, the measurement component 730 is capable of, configured to, or operable to support a means for measuring a center frequency offset for the XR device based on receiving the one or more first pilot signals, where the first set of correction factors is based on the center frequency offset.

In some examples, to support measuring the center frequency offset, the measurement component 730 is capable of, configured to, or operable to support a means for averaging the one or more first pilot signals. In some examples, to support measuring the center frequency offset, the measurement component 730 is capable of, configured to, or operable to support a means for applying a loop filter to the one or more first pilot signals.

In some examples, the correction component 735 is capable of, configured to, or operable to support a means for calculating a PPM error or one or more frequency offsets based on the center frequency offset, where the first set of correction factors includes the PPM error or the one or more frequency offsets.

In some examples, the measurement component 730 is capable of, configured to, or operable to support a means for measuring a STO for the XR device based on receiving the second control message, where the second set of correction factors is based on the STO.

In some examples, to support measuring the STO, the measurement component 730 is capable of, configured to, or operable to support a means for averaging the one or more time domain samples of the second pilot signal. In some examples, to support measuring the STO, the measurement component 730 is capable of, configured to, or operable to support a means for applying a loop filter to the one or more time domain samples of the second pilot signal.

In some examples, the time advance component 745 is capable of, configured to, or operable to support a means for transmitting, based on a channel propagation delay associated with receiving the one or more first pilot signals, an indication of one or more time advance values to apply to the time synchronization between the UE and the XR device, where the one or more time advance values are different from the first set of correction factors and the second set of correction factors.

In some examples, a quantity of the one or more first pilot signals is based on a SNR associated with the wireless communication between the UE and the XR device.

In some examples, the synchronization loop component 740 is capable of, configured to, or operable to support a means for transmitting, to the XR device, an indication of the first periodicity and the second periodicity, where the second periodicity is less than the first periodicity.

In some examples, the one or more first pilot signals or the second pilot signal correspond to least one of a SSB, a SLSS, a TRS, a PTRS, a DMRS, or a combination thereof.

In some examples, the first control message, the second control message, or the third control message are communicated via SCI Format 1.

Figure 8:
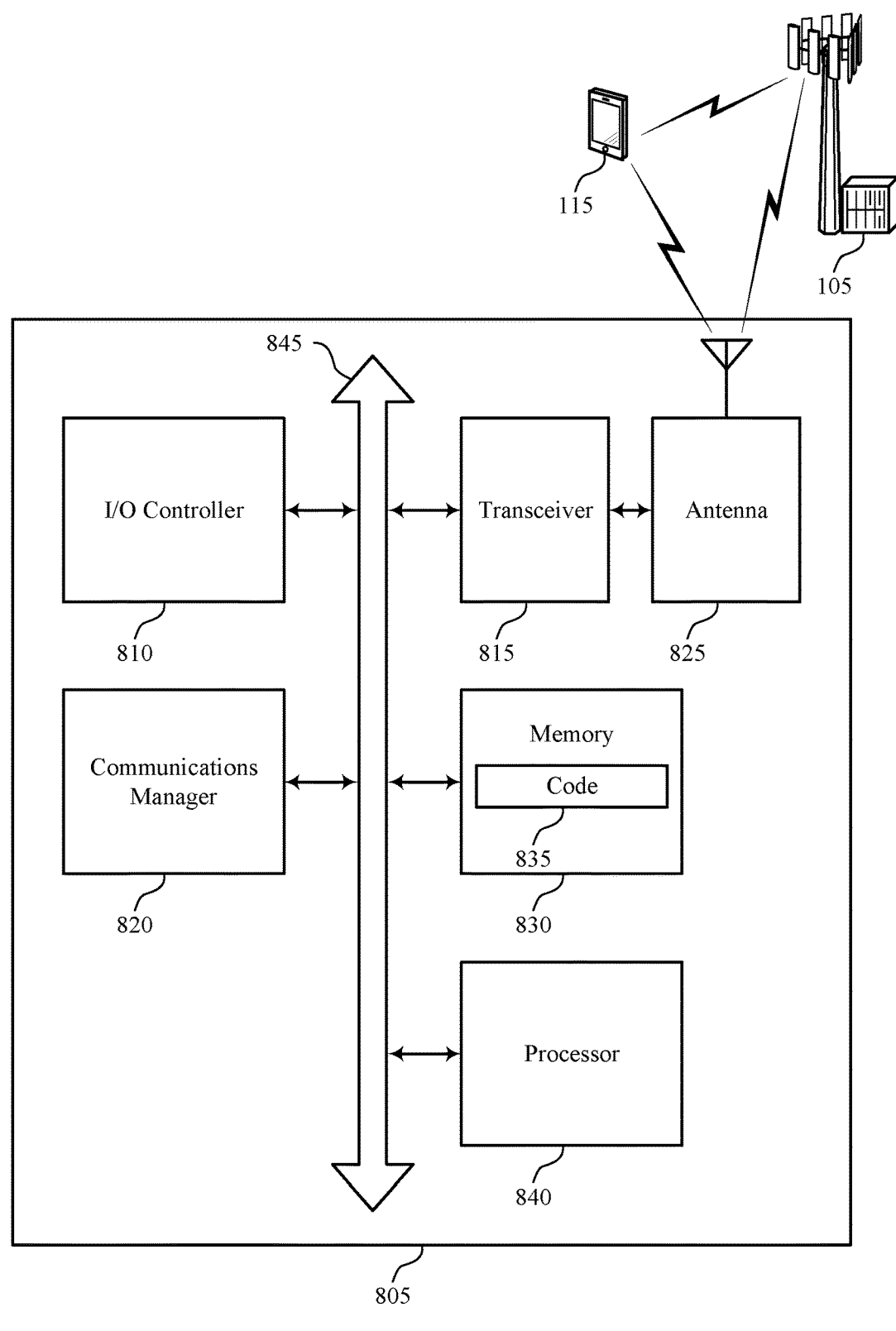
FIG. 8 shows a diagram of a system including a device that supports XR device synchronization management in accordance with one or more aspects of the present disclosure.

FIG. 8 shows a diagram of a system 800 including a device 805 that supports XR device synchronization management in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting XR device synchronization management). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communication in accordance with examples as disclosed herein. For example, the communications manager 820 is capable of, configured to, or operable to support a means for performing an initialization procedure with an XR device including a time synchronization and a frequency synchronization between the UE and the XR device. The communications manager 820 is capable of, configured to, or operable to support a means for receiving, from the XR device and at a first periodicity, one or more first pilot signals. The communications manager 820 is capable of, configured to, or operable to support a means for transmitting, based on receiving the one or more first pilot signals, a first control message indicating a first set of correction factors to apply to at least one of the time synchronization or the frequency synchronization between the UE and the XR device. The communications manager 820 is capable of, configured to, or operable to support a means for transmitting, to the XR device and at a second periodicity, a second pilot signal. The communications manager 820 is capable of, configured to, or operable to support a means for receiving, from the XR device, a second control message including one or more time domain samples of the second pilot signal. The communications manager 820 is capable of, configured to, or operable to support a means for transmitting, based on the one or more time domain samples, a third control message indicating a second set of correction factors to apply to the time synchronization between the UE and the XR device.

By including or configuring the communications manager 820 in accordance with examples as described herein, the device 805 may support techniques for improved user experience related to reduced processing, reduced power consumption, and longer battery life. For example, by offloading sensors or processors associated with time and frequency synchronization loop management from the receive-side to the transmit-side, the device 805 may support reduced processing at the XR device, which may improve a battery life of the XR device and may improve a form factor due to the XR device including fewer sensors and enabling a smaller XR device.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of XR device synchronization management as described herein, or the at least one processor 840 and the at least one memory 830 may be otherwise configured to, individually or collectively, perform or support such operations.

Figure 9:
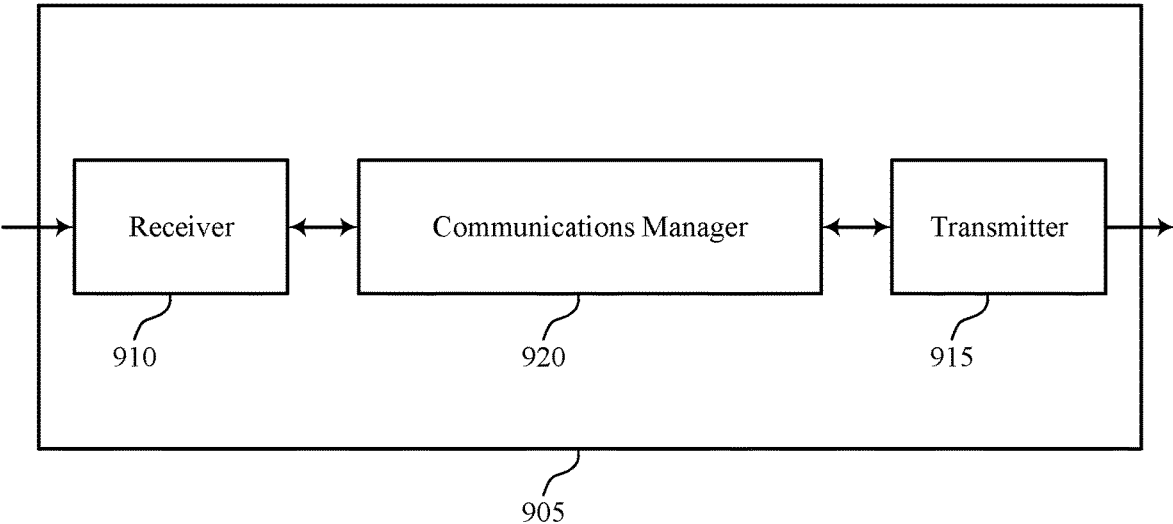
FIGS. 9 and 10 show block diagrams of devices that support XR device synchronization management in accordance with one or more aspects of the present disclosure.

FIG. 9 shows a block diagram 900 of a device 905 that supports XR device synchronization management in accordance with one or more aspects of the present disclosure. The device 905 may be an example of aspects of an XR device as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to XR device synchronization management). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to XR device synchronization management). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of XR device synchronization management as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for performing an initialization procedure with a UE including a time synchronization and a frequency synchronization between the UE and the XR device. The communications manager 920 is capable of, configured to, or operable to support a means for transmitting, to the UE and at a first periodicity, one or more first pilot signals. The communications manager 920 is capable of, configured to, or operable to support a means for receiving, based on transmitting the one or more first pilot signals, a first control message indicating a first set of correction factors to apply to at least one of the time synchronization or the frequency synchronization between the UE and the XR device. The communications manager 920 is capable of, configured to, or operable to support a means for receiving, from the UE and at a second periodicity, a second pilot signal. The communications manager 920 is capable of, configured to, or operable to support a means for transmitting, to the UE, a second control message including one or more time domain samples of the second pilot signal. The communications manager 920 is capable of, configured to, or operable to support a means for receiving, based on the one or more time domain samples, a third control message indicating a second set of correction factors to apply to the time synchronization between the UE and the XR device.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing and reduced power consumption. For example, by shifting functionality related to synchronization loop management from the receive-side (e.g., XR device) to the transmit-side (e.g., companion UE), the described techniques may support reduced processing at the XR device which may support greater functionality and reduced power consumption at the XR device by shifting a portion of the processing load to the companion UE device.

Figure 10:
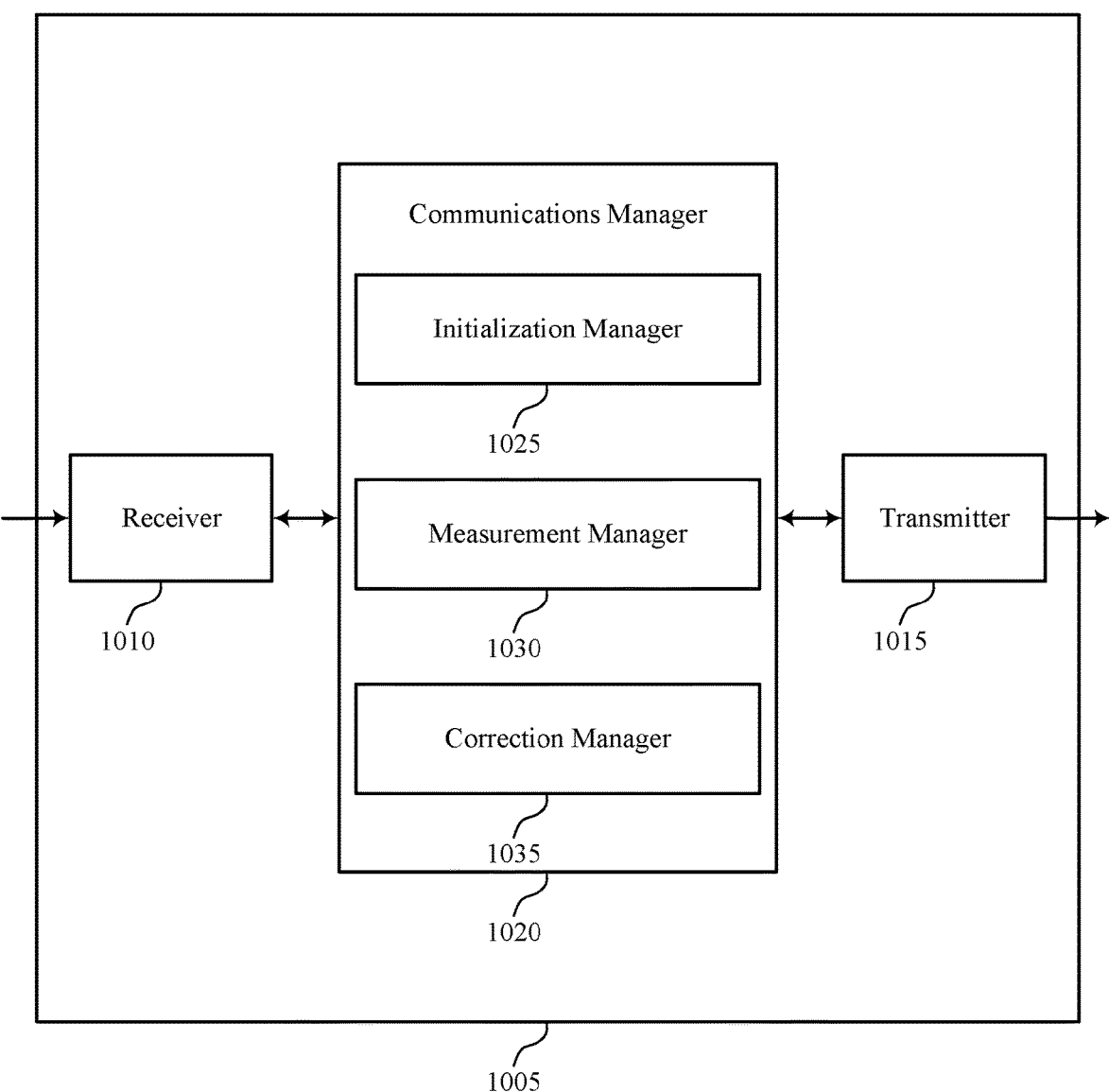

FIG. 10 shows a block diagram 1000 of a device 1005 that supports XR device synchronization management in accordance with one or more aspects of the present disclosure. The device 1005 may be an example of aspects of a device 905 or an XR device as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to XR device synchronization management). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to XR device synchronization management). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of XR device synchronization management as described herein. For example, the communications manager 1020 may include an initialization manager 1025, a measurement manager 1030, a correction manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The initialization manager 1025 is capable of, configured to, or operable to support a means for performing an initialization procedure with a UE including a time synchronization and a frequency synchronization between the UE and the XR device. The measurement manager 1030 is capable of, configured to, or operable to support a means for transmitting, to the UE and at a first periodicity, one or more first pilot signals. The correction manager 1035 is capable of, configured to, or operable to support a means for receiving, based on transmitting the one or more first pilot signals, a first control message indicating a first set of correction factors to apply to at least one of the time synchronization or the frequency synchronization between the UE and the XR device. The measurement manager 1030 is capable of, configured to, or operable to support a means for receiving, from the UE and at a second periodicity, a second pilot signal. The measurement manager 1030 is capable of, configured to, or operable to support a means for transmitting, to the UE, a second control message including one or more time domain samples of the second pilot signal. The correction manager 1035 is capable of, configured to, or operable to support a means for receiving, based on the one or more time domain samples, a third control message indicating a second set of correction factors to apply to the time synchronization between the UE and the XR device.

Figure 11:
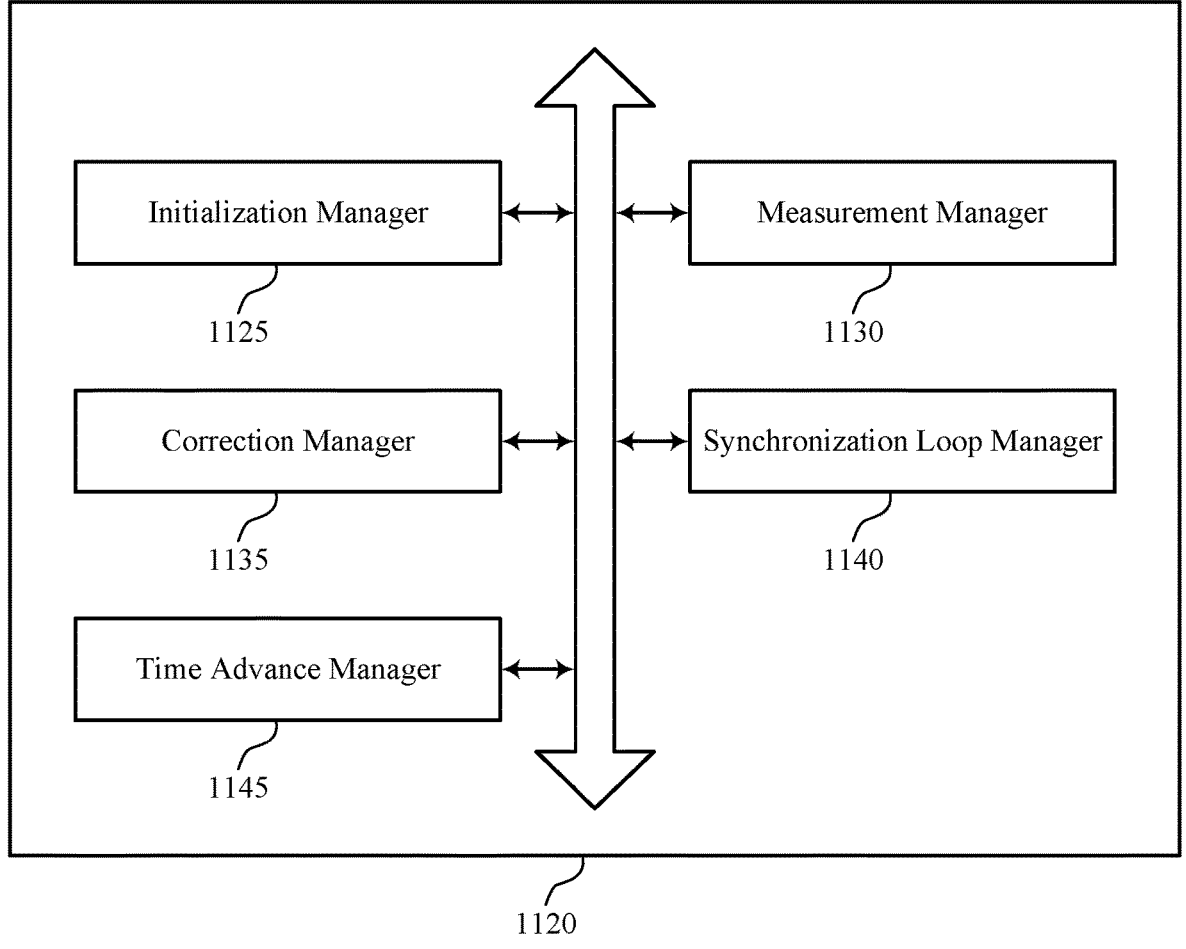
FIG. 11 shows a block diagram of a communications manager that supports XR device synchronization management in accordance with one or more aspects of the present disclosure.

FIG. 11 shows a block diagram 1100 of a communications manager 1120 that supports XR device synchronization management in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of XR device synchronization management as described herein. For example, the communications manager 1120 may include an initialization manager 1125, a measurement manager 1130, a correction manager 1135, a synchronization loop manager 1140, a time advance manager 1145, or any combination thereof. Each of these components, or components or subcomponents thereof (e.g., one or more processors, one or more memories), may communicate, directly or indirectly, with one another (e.g., via one or more buses).

The communications manager 1120 may support wireless communication in accordance with examples as disclosed herein. The initialization manager 1125 is capable of, configured to, or operable to support a means for performing an initialization procedure with a UE including a time synchronization and a frequency synchronization between the UE and the XR device. The measurement manager 1130 is capable of, configured to, or operable to support a means for transmitting, to the UE and at a first periodicity, one or more first pilot signals. The correction manager 1135 is capable of, configured to, or operable to support a means for receiving, based on transmitting the one or more first pilot signals, a first control message indicating a first set of correction factors to apply to at least one of the time synchronization or the frequency synchronization between the UE and the XR device. In some examples, the measurement manager 1130 is capable of, configured to, or operable to support a means for receiving, from the UE and at a second periodicity, a second pilot signal. In some examples, the measurement manager 1130 is capable of, configured to, or operable to support a means for transmitting, to the UE, a second control message including one or more time domain samples of the second pilot signal. In some examples, the correction manager 1135 is capable of, configured to, or operable to support a means for receiving, based on the one or more time domain samples, a third control message indicating a second set of correction factors to apply to the time synchronization between the UE and the XR device.

In some examples, to support receiving the second pilot signal, the synchronization loop manager 1140 is capable of, configured to, or operable to support a means for receiving a synchronization loop indication message indicating a transmission of the second pilot signal.

In some examples, the first set of correction factors includes a PPM error or one or more frequency offsets to apply to at least one of the time synchronization or the frequency synchronization between the UE and the XR device.

In some examples, the correction manager 1135 is capable of, configured to, or operable to support a means for applying at least one of the PPM error or the one or more frequency offsets to at least one of an oscillator, a synthesizer, a PLL, a counter, a clock, or a resampling component of the XR device.

In some examples, the second set of correction factors includes a timing offset to apply to the time synchronization between the UE and the XR device.

In some examples, the correction manager 1135 is capable of, configured to, or operable to support a means for applying the timing offset to at least one of an oscillator, a synthesizer, a PLL, a counter, a clock, or a resampling component of the XR device.

In some examples, the time advance manager 1145 is capable of, configured to, or operable to support a means for receiving, based on a channel propagation delay associated with transmitting the one or more first pilot signals, an indication of one or more time advance values to apply to the time synchronization between the UE and the XR device, where the one or more time advance values are different from the first set of correction factors and the second set of correction factors.

In some examples, a quantity of the one or more first pilot signals is based on a SNR associated with the wireless communication between the UE and the XR device.

In some examples, the synchronization loop manager 1140 is capable of, configured to, or operable to support a means for receiving, from the XR device, an indication of the first periodicity and the second periodicity, where the second periodicity is less than the first periodicity.

In some examples, the one or more first pilot signals or the second pilot signal correspond to least one of a SSB, a SLSS, a TRS, a PTRS, a DMRS, or a combination thereof.

In some examples, the first control message, the second control message, or the third control message are communicated via SCI Format 1.

Figure 12:
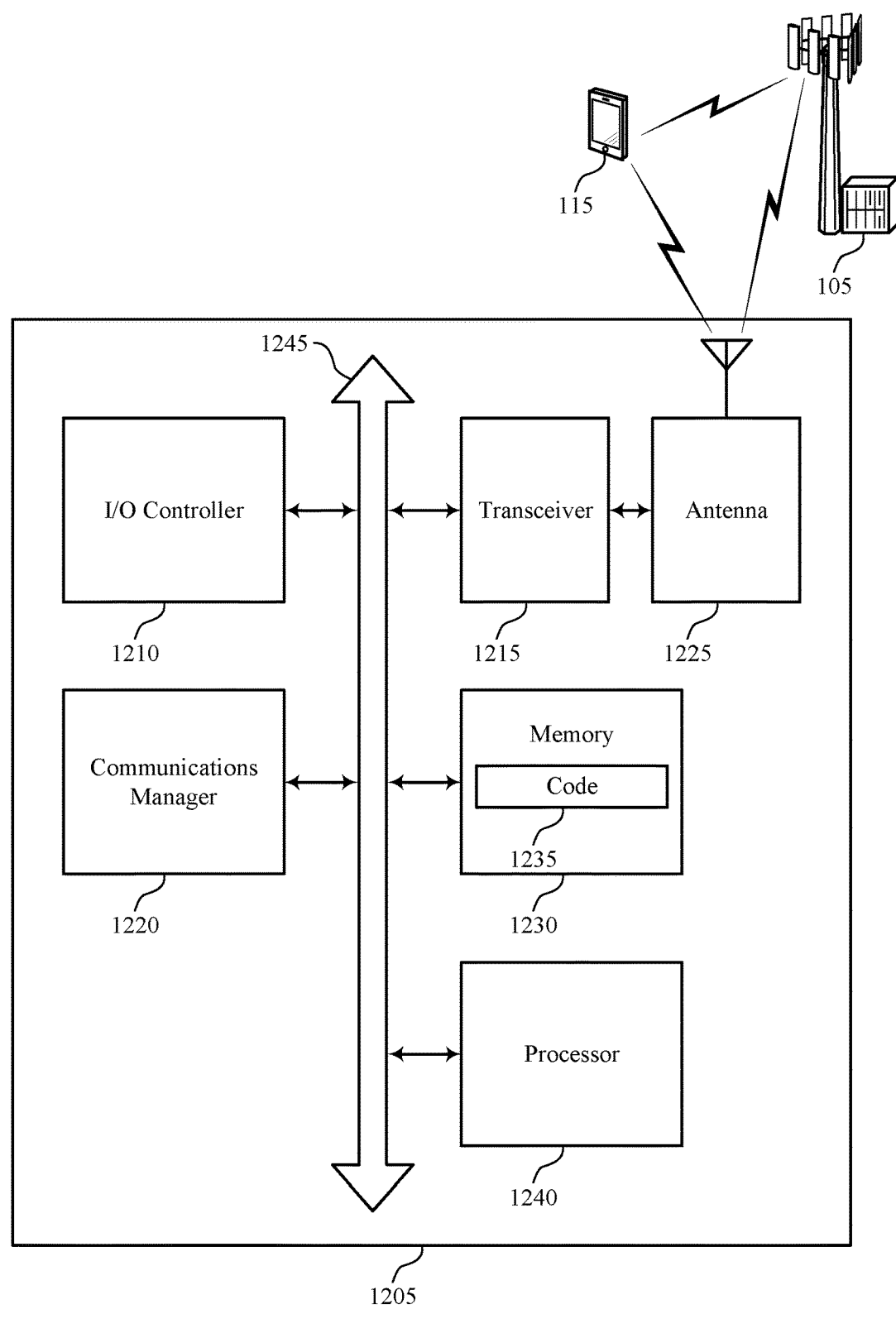
FIG. 12 shows a diagram of a system including a device that supports XR device synchronization management in accordance with one or more aspects of the present disclosure.

FIG. 12 shows a diagram of a system 1200 including a device 1205 that supports XR device synchronization management in accordance with one or more aspects of the present disclosure. The device 1205 may be an example of or include the components of a device 905, a device 1005, or an XR device as described herein. The device 1205 may include components for bi-directional voice and data communications including components for transmitting and receiving communications, such as a communications manager 1220, an I/O controller 1210, a transceiver 1215, an antenna 1225, at least one memory 1230, code 1235, and at least one processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205.

In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include RAM and ROM. The at least one memory 1230 may store computer-readable, computer-executable code 1235 including instructions that, when executed by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may contain, among other things, a BIOS which may control basic hardware or software operation such as the interaction with peripheral components or devices.

The at least one processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1240 may be configured to operate a memory array using a memory controller. In some other cases, a memory controller may be integrated into the at least one processor 1240. The at least one processor 1240 may be configured to execute computer-readable instructions stored in a memory (e.g., the at least one memory 1230) to cause the device 1205 to perform various functions (e.g., functions or tasks supporting XR device synchronization management). For example, the device 1205 or a component of the device 1205 may include at least one processor 1240 and at least one memory 1230 coupled with or to the at least one processor 1240, the at least one processor 1240 and at least one memory 1230 configured to perform various functions described herein. In some examples, the at least one processor 1240 may include multiple processors and the at least one memory 1230 may include multiple memories. One or more of the multiple processors may be coupled with one or more of the multiple memories, which may, individually or collectively, be configured to perform various functions herein.

The communications manager 1220 may support wireless communication in accordance with examples as disclosed herein. For example, the communications manager 1220 is capable of, configured to, or operable to support a means for performing an initialization procedure with a UE including a time synchronization and a frequency synchronization between the UE and the XR device. The communications manager 1220 is capable of, configured to, or operable to support a means for transmitting, to the UE and at a first periodicity, one or more first pilot signals. The communications manager 1220 is capable of, configured to, or operable to support a means for receiving, based on transmitting the one or more first pilot signals, a first control message indicating a first set of correction factors to apply to at least one of the time synchronization or the frequency synchronization between the UE and the XR device. The communications manager 1220 is capable of, configured to, or operable to support a means for receiving, from the UE and at a second periodicity, a second pilot signal. The communications manager 1220 is capable of, configured to, or operable to support a means for transmitting, to the UE, a second control message including one or more time domain samples of the second pilot signal. The communications manager 1220 is capable of, configured to, or operable to support a means for receiving, based on the one or more time domain samples, a third control message indicating a second set of correction factors to apply to the time synchronization between the UE and the XR device.

By including or configuring the communications manager 1220 in accordance with examples as described herein, the device 1205 may support techniques for improved user experience related to reduced processing, reduced power consumption, and longer battery life. For example, by offloading sensors or processors associated with time and frequency synchronization loop management from the receive-side to the transmit-side, the device 1205 may support reduced processing at the XR device, which may improve a battery life of the XR device and may improve a form factor due to the XR device including fewer sensors and enabling a smaller XR device.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of XR device synchronization management as described herein, or the at least one processor 1240 and the at least one memory 1230 may be otherwise configured to, individually or collectively, perform or support such operations.

FIG. 13 shows a flowchart illustrating a method 1300 that supports XR device synchronization management in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include performing an initialization procedure with an XR device including a time synchronization and a frequency synchronization between the UE and the XR device. The operations of block 1305 may be performed in accordance with examples as disclosed herein. In some examples, aspects of the operations of 1305 may be performed by an initialization component 725 as described with reference to FIG. 7.

At 1310, the method may include receiving, from the XR device and at a first periodicity, one or more first pilot signals. The operations of block 1310 may be performed in accordance with examples as disclosed herein. In some examples, aspects of the operations of 1310 may be performed by a measurement component 730 as described with reference to FIG. 7.

At 1315, the method may include transmitting, based on receiving the one or more first pilot signals, a first control message indicating a first set of correction factors to apply to at least one of the time synchronization or the frequency synchronization between the UE and the XR device. The operations of block 1315 may be performed in accordance with examples as disclosed herein. In some examples, aspects of the operations of 1315 may be performed by a correction component 735 as described with reference to FIG. 7.

At 1320, the method may include transmitting, to the XR device and at a second periodicity, a second pilot signal. The operations of block 1320 may be performed in accordance with examples as disclosed herein. In some examples, aspects of the operations of 1320 may be performed by a measurement component 730 as described with reference to FIG. 7.

At 1325, the method may include receiving, from the XR device, a second control message including one or more time domain samples of the second pilot signal. The operations of block 1325 may be performed in accordance with examples as disclosed herein. In some examples, aspects of the operations of 1325 may be performed by a measurement component 730 as described with reference to FIG. 7.

At 1330, the method may include transmitting, based on the one or more time domain samples, a third control message indicating a second set of correction factors to apply to the time synchronization between the UE and the XR device. The operations of block 1330 may be performed in accordance with examples as disclosed herein. In some examples, aspects of the operations of 1330 may be performed by a correction component 735 as described with reference to FIG. 7.

FIG. 14 shows a flowchart illustrating a method 1400 that supports XR device synchronization management in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include performing an initialization procedure with an XR device including a time synchronization and a frequency synchronization between the UE and the XR device. The operations of block 1405 may be performed in accordance with examples as disclosed herein. In some examples, aspects of the operations of 1405 may be performed by an initialization component 725 as described with reference to FIG. 7.

At 1410, the method may include receiving, from the XR device and at a first periodicity, one or more first pilot signals. The operations of block 1410 may be performed in accordance with examples as disclosed herein. In some examples, aspects of the operations of 1410 may be performed by a measurement component 730 as described with reference to FIG. 7.

At 1415, the method may include transmitting, based on receiving the one or more first pilot signals, a first control message indicating a first set of correction factors to apply to at least one of the time synchronization or the frequency synchronization between the UE and the XR device. The operations of block 1415 may be performed in accordance with examples as disclosed herein. In some examples, aspects of the operations of 1415 may be performed by a correction component 735 as described with reference to FIG. 7.

At 1420, the method may include transmitting a synchronization loop indication message indicating a transmission of a second pilot signal. The operations of block 1420 may be performed in accordance with examples as disclosed herein. In some examples, aspects of the operations of 1420 may be performed by a synchronization loop component 740 as described with reference to FIG. 7.

At 1425, the method may include transmitting, to the XR device and at a second periodicity, the second pilot signal. The operations of block 1425 may be performed in accordance with examples as disclosed herein. In some examples, aspects of the operations of 1425 may be performed by a measurement component 730 as described with reference to FIG. 7.

At 1430, the method may include receiving, from the XR device, a second control message including one or more time domain samples of the second pilot signal. The operations of block 1430 may be performed in accordance with examples as disclosed herein. In some examples, aspects of the operations of 1430 may be performed by a measurement component 730 as described with reference to FIG. 7.

At 1435, the method may include transmitting, based on the one or more time domain samples, a third control message indicating a second set of correction factors to apply to the time synchronization between the UE and the XR device. The operations of block 1435 may be performed in accordance with examples as disclosed herein. In some examples, aspects of the operations of 1435 may be performed by a correction component 735 as described with reference to FIG. 7.

Figure 15:
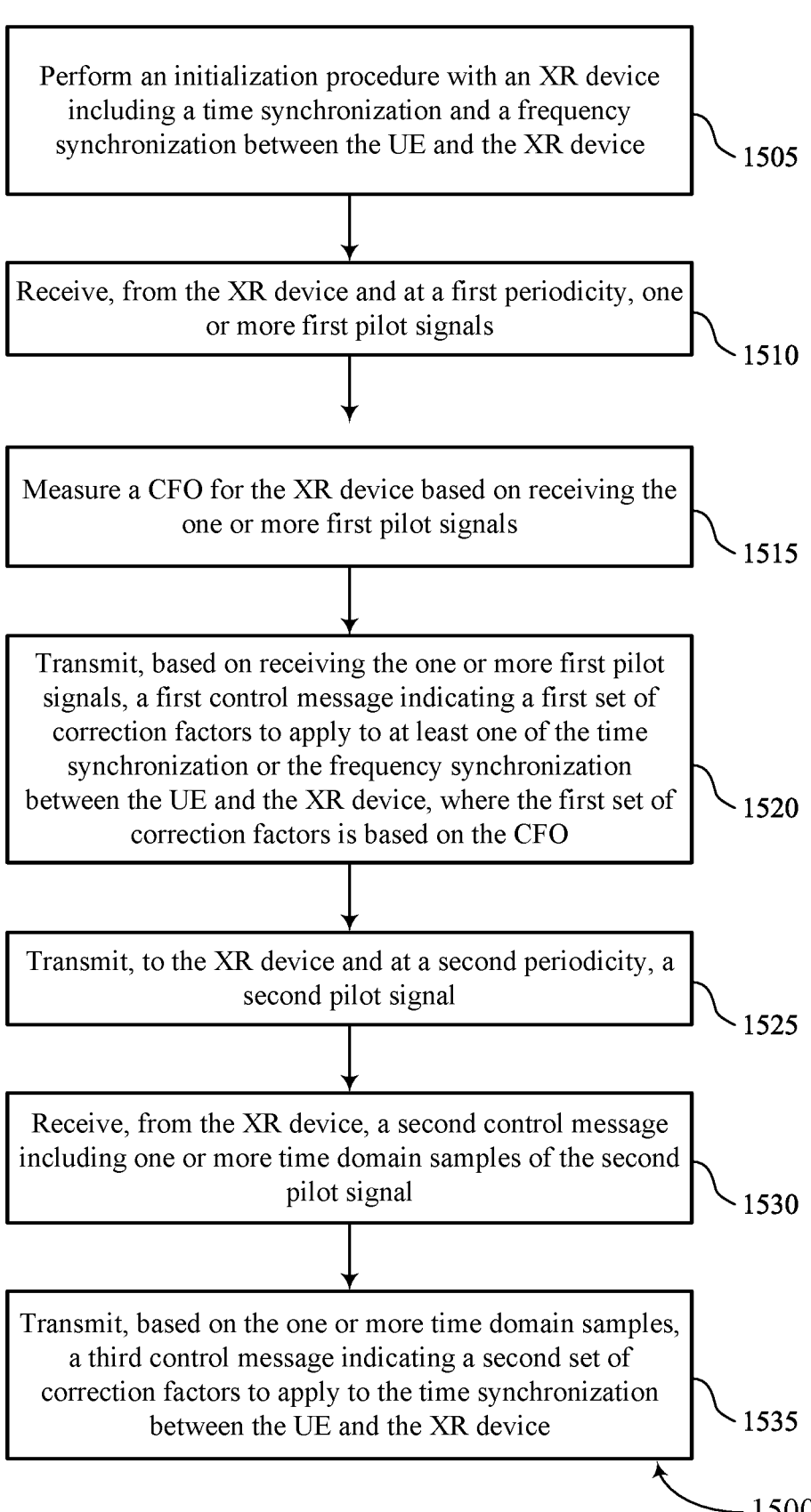

FIG. 15 shows a flowchart illustrating a method 1500 that supports XR device synchronization management in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include performing an initialization procedure with an XR device including a time synchronization and a frequency synchronization between the UE and the XR device. The operations of block 1505 may be performed in accordance with examples as disclosed herein. In some examples, aspects of the operations of 1505 may be performed by an initialization component 725 as described with reference to FIG. 7.

At 1510, the method may include receiving, from the XR device and at a first periodicity, one or more first pilot signals. The operations of block 1510 may be performed in accordance with examples as disclosed herein. In some examples, aspects of the operations of 1510 may be performed by a measurement component 730 as described with reference to FIG. 7.

At 1515, the method may include measuring a CFO for the XR device based on receiving the one or more first pilot signals. The operations of block 1515 may be performed in accordance with examples as disclosed herein. In some examples, aspects of the operations of 1515 may be performed by a measurement component 730 as described with reference to FIG. 7.

At 1520, the method may include transmitting, based on receiving the one or more first pilot signals, a first control message indicating a first set of correction factors to apply to at least one of the time synchronization or the frequency synchronization between the UE and the XR device, where the first set of correction factors is based on the CFO. The operations of block 1520 may be performed in accordance with examples as disclosed herein. In some examples, aspects of the operations of 1520 may be performed by a correction component 735 as described with reference to FIG. 7.

At 1525, the method may include transmitting, to the XR device and at a second periodicity, a second pilot signal. The operations of block 1525 may be performed in accordance with examples as disclosed herein. In some examples, aspects of the operations of 1525 may be performed by a measurement component 730 as described with reference to FIG. 7.

At 1530, the method may include receiving, from the XR device, a second control message including one or more time domain samples of the second pilot signal. The operations of block 1530 may be performed in accordance with examples as disclosed herein. In some examples, aspects of the operations of 1530 may be performed by a measurement component 730 as described with reference to FIG. 7.

At 1535, the method may include transmitting, based on the one or more time domain samples, a third control message indicating a second set of correction factors to apply to the time synchronization between the UE and the XR device. The operations of block 1535 may be performed in accordance with examples as disclosed herein. In some examples, aspects of the operations of 1535 may be performed by a correction component 735 as described with reference to FIG. 7.

FIG. 16 shows a flowchart illustrating a method 1600 that supports XR device synchronization management in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include performing an initialization procedure with an XR device including a time synchronization and a frequency synchronization between the UE and the XR device. The operations of block 1605 may be performed in accordance with examples as disclosed herein. In some examples, aspects of the operations of 1605 may be performed by an initialization component 725 as described with reference to FIG. 7.

At 1610, the method may include receiving, from the XR device and at a first periodicity, one or more first pilot signals. The operations of block 1610 may be performed in accordance with examples as disclosed herein. In some examples, aspects of the operations of 1610 may be performed by a measurement component 730 as described with reference to FIG. 7.

At 1615, the method may include transmitting, based on receiving the one or more first pilot signals, a first control message indicating a first set of correction factors to apply to at least one of the time synchronization or the frequency synchronization between the UE and the XR device. The operations of block 1615 may be performed in accordance with examples as disclosed herein. In some examples, aspects of the operations of 1615 may be performed by a correction component 735 as described with reference to FIG. 7.

At 1620, the method may include transmitting, to the XR device and at a second periodicity, a second pilot signal. The operations of block 1620 may be performed in accordance with examples as disclosed herein. In some examples, aspects of the operations of 1620 may be performed by a measurement component 730 as described with reference to FIG. 7.

At 1625, the method may include receiving, from the XR device, a second control message including one or more time domain samples of the second pilot signal. The operations of block 1625 may be performed in accordance with examples as disclosed herein. In some examples, aspects of the operations of 1625 may be performed by a measurement component 730 as described with reference to FIG. 7.

At 1630, the method may include measuring a STO for the XR device based on receiving the second control message. The operations of block 1630 may be performed in accordance with examples as disclosed herein. In some examples, aspects of the operations of 1630 may be performed by a measurement component 730 as described with reference to FIG. 7.

At 1635, the method may include transmitting, based on the one or more time domain samples, a third control message indicating a second set of correction factors to apply to the time synchronization between the UE and the XR device, where the second set of correction factors is based on the STO. The operations of block 1635 may be performed in accordance with examples as disclosed herein. In some examples, aspects of the operations of 1635 may be performed by a correction component 735 as described with reference to FIG. 7.

FIG. 17 shows a flowchart illustrating a method 1700 that supports XR device synchronization management in accordance with aspects of the present disclosure. The operations of the method 1700 may be implemented by an XR device or its components as described herein. For example, the operations of the method 1700 may be performed by an XR device as described with reference to FIGS. 1 through 4 and 9 through 12. In some examples, an XR device may execute a set of instructions to control the functional elements of the XR device to perform the described functions. Additionally, or alternatively, the XR device may perform aspects of the described functions using special-purpose hardware.

At 1705, the method may include performing an initialization procedure with a UE including a time synchronization and a frequency synchronization between the UE and the XR device. The operations of block 1705 may be performed in accordance with examples as disclosed herein. In some examples, aspects of the operations of 1705 may be performed by an initialization manager 1125 as described with reference to FIG. 11.

At 1710, the method may include transmitting, to the UE and at a first periodicity, one or more first pilot signals. The operations of block 1710 may be performed in accordance with examples as disclosed herein. In some examples, aspects of the operations of 1710 may be performed by a measurement manager 1130 as described with reference to FIG. 11.

At 1715, the method may include receiving, based on transmitting the one or more first pilot signals, a first control message indicating a first set of correction factors to apply to at least one of the time synchronization or the frequency synchronization between the UE and the XR device. The operations of block 1715 may be performed in accordance with examples as disclosed herein. In some examples, aspects of the operations of 1715 may be performed by a correction manager 1135 as described with reference to FIG. 11.

At 1720, the method may include receiving, from the UE and at a second periodicity, a second pilot signal. The operations of block 1720 may be performed in accordance with examples as disclosed herein. In some examples, aspects of the operations of 1720 may be performed by a measurement manager 1130 as described with reference to FIG. 11.

At 1725, the method may include transmitting, to the UE, a second control message including one or more time domain samples of the second pilot signal. The operations of block 1725 may be performed in accordance with examples as disclosed herein. In some examples, aspects of the operations of 1725 may be performed by a measurement manager 1130 as described with reference to FIG. 11.

At 1730, the method may include receiving, based on the one or more time domain samples, a third control message indicating a second set of correction factors to apply to the time synchronization between the UE and the XR device. The operations of block 1730 may be performed in accordance with examples as disclosed herein. In some examples, aspects of the operations of 1730 may be performed by a correction manager 1135 as described with reference to FIG. 11.

FIG. 18 shows a flowchart illustrating a method 1800 that supports XR device synchronization management in accordance with aspects of the present disclosure. The operations of the method 1800 may be implemented by an XR device or its components as described herein. For example, the operations of the method 1800 may be performed by an XR device as described with reference to FIGS. 1 through 4 and 9 through 12. In some examples, an XR device may execute a set of instructions to control the functional elements of the XR device to perform the described functions. Additionally, or alternatively, the XR device may perform aspects of the described functions using special-purpose hardware.

At 1805, the method may include performing an initialization procedure with a UE including a time synchronization and a frequency synchronization between the UE and the XR device. The operations of block 1805 may be performed in accordance with examples as disclosed herein. In some examples, aspects of the operations of 1805 may be performed by an initialization manager 1125 as described with reference to FIG. 11.

At 1810, the method may include transmitting, to the UE and at a first periodicity, one or more first pilot signals. The operations of block 1810 may be performed in accordance with examples as disclosed herein. In some examples, aspects of the operations of 1810 may be performed by a measurement manager 1130 as described with reference to FIG. 11.

At 1815, the method may include receiving, based on transmitting the one or more first pilot signals, a first control message indicating a first set of correction factors to apply to at least one of the time synchronization or the frequency synchronization between the UE and the XR device, where the first set of correction factors includes a PPM error or one or more frequency offsets to apply to at least one of the time synchronization or the frequency synchronization between the UE and the XR device. The operations of block 1815 may be performed in accordance with examples as disclosed herein. In some examples, aspects of the operations of 1815 may be performed by a correction manager 1135 as described with reference to FIG. 11.

At 1820, the method may include applying at least one of the PPM error or the one or more frequency offsets to at least one of an oscillator, a synthesizer, a PLL, a counter, a clock, or a resampling component of the XR device. The operations of block 1820 may be performed in accordance with examples as disclosed herein. In some examples, aspects of the operations of 1820 may be performed by a correction manager 1135 as described with reference to FIG. 11.

At 1825, the method may include receiving, from the UE and at a second periodicity, a second pilot signal. The operations of block 1825 may be performed in accordance with examples as disclosed herein. In some examples, aspects of the operations of 1825 may be performed by a measurement manager 1130 as described with reference to FIG. 11.

At 1830, the method may include transmitting, to the UE, a second control message including one or more time domain samples of the second pilot signal. The operations of block 1830 may be performed in accordance with examples as disclosed herein. In some examples, aspects of the operations of 1830 may be performed by a measurement manager 1130 as described with reference to FIG. 11.

At 1835, the method may include receiving, based on the one or more time domain samples, a third control message indicating a second set of correction factors to apply to the time synchronization between the UE and the XR device. The operations of block 1835 may be performed in accordance with examples as disclosed herein. In some examples, aspects of the operations of 1835 may be performed by a correction manager 1135 as described with reference to FIG. 11.

Figure 19:
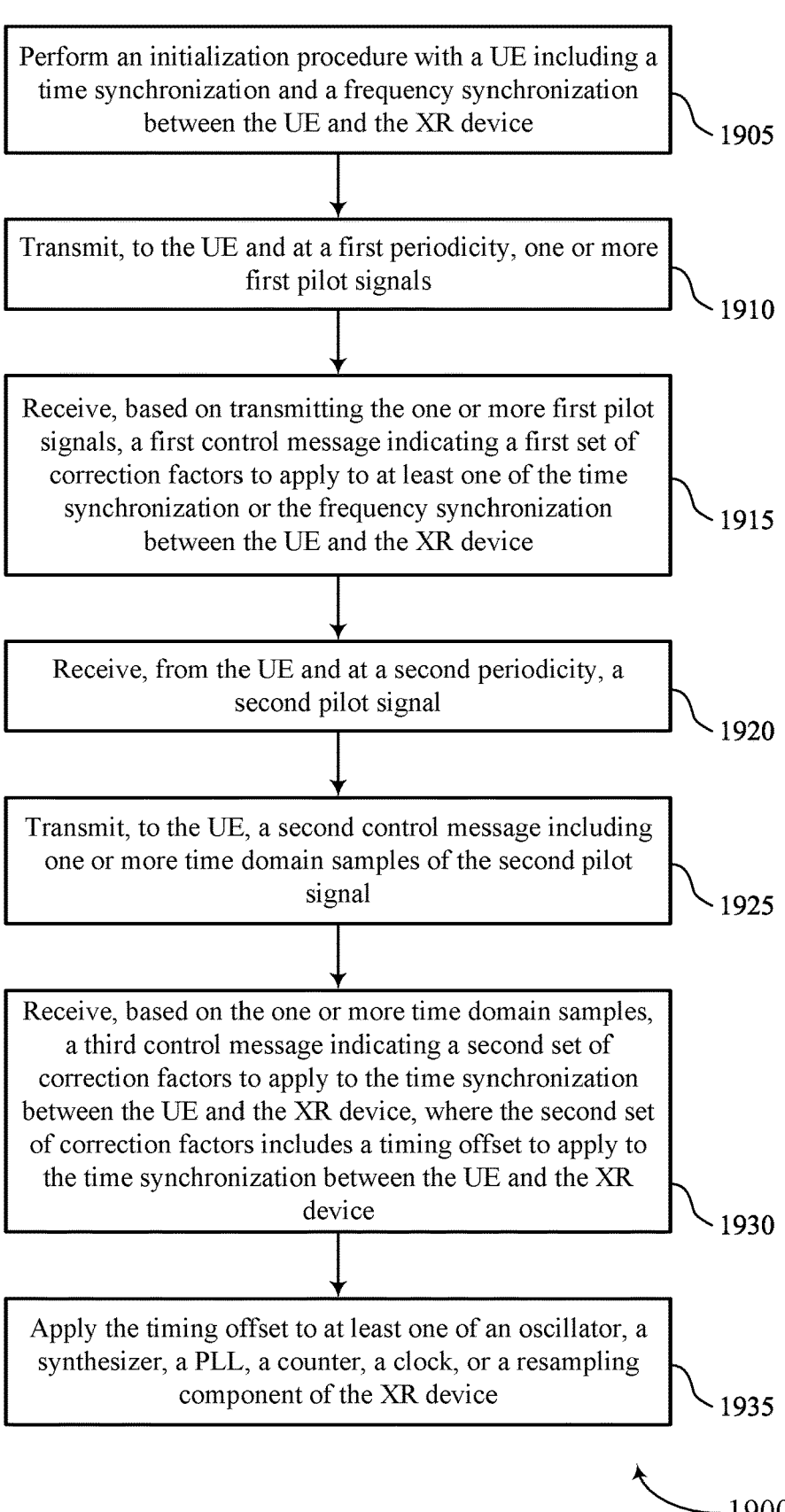

FIG. 19 shows a flowchart illustrating a method 1900 that supports XR device synchronization management in accordance with aspects of the present disclosure. The operations of the method 1900 may be implemented by an XR device or its components as described herein. For example, the operations of the method 1900 may be performed by an XR device as described with reference to FIGS. 1 through 4 and 9 through 12. In some examples, an XR device may execute a set of instructions to control the functional elements of the XR device to perform the described functions. Additionally, or alternatively, the XR device may perform aspects of the described functions using special-purpose hardware.

At 1905, the method may include performing an initialization procedure with a UE including a time synchronization and a frequency synchronization between the UE and the XR device. The operations of block 1905 may be performed in accordance with examples as disclosed herein. In some examples, aspects of the operations of 1905 may be performed by an initialization manager 1125 as described with reference to FIG. 11.

At 1910, the method may include transmitting, to the UE and at a first periodicity, one or more first pilot signals. The operations of block 1910 may be performed in accordance with examples as disclosed herein. In some examples, aspects of the operations of 1910 may be performed by a measurement manager 1130 as described with reference to FIG. 11.

At 1915, the method may include receiving, based on transmitting the one or more first pilot signals, a first control message indicating a first set of correction factors to apply to at least one of the time synchronization or the frequency synchronization between the UE and the XR device. The operations of block 1915 may be performed in accordance with examples as disclosed herein. In some examples, aspects of the operations of 1915 may be performed by a correction manager 1135 as described with reference to FIG. 11.

At 1920, the method may include receiving, from the UE and at a second periodicity, a second pilot signal. The operations of block 1920 may be performed in accordance with examples as disclosed herein. In some examples, aspects of the operations of 1920 may be performed by a measurement manager 1130 as described with reference to FIG. 11.

At 1925, the method may include transmitting, to the UE, a second control message including one or more time domain samples of the second pilot signal. The operations of block 1925 may be performed in accordance with examples as disclosed herein. In some examples, aspects of the operations of 1925 may be performed by a measurement manager 1130 as described with reference to FIG. 11.

At 1930, the method may include receiving, based on the one or more time domain samples, a third control message indicating a second set of correction factors to apply to the time synchronization between the UE and the XR device, where the second set of correction factors includes a timing offset to apply to the time synchronization between the UE and the XR device. The operations of block 1930 may be performed in accordance with examples as disclosed herein. In some examples, aspects of the operations of 1930 may be performed by a correction manager 1135 as described with reference to FIG. 11.

At 1935, the method may include applying the timing offset to at least one of an oscillator, a synthesizer, a PLL, a counter, a clock, or a resampling component of the XR device. The operations of block 1935 may be performed in accordance with examples as disclosed herein. In some examples, aspects of the operations of 1935 may be performed by a correction manager 1135 as described with reference to FIG. 11.

The following provides an overview of aspects of the present disclosure:

Aspect 1: A method for wireless communication by a UE, comprising: performing an initialization procedure with an XR device comprising a time synchronization and a frequency synchronization between the UE and the XR device; receiving, from the XR device and at a first periodicity, one or more first pilot signals; transmitting, based at least in part on receiving the one or more first pilot signals, a first control message indicating a first set of correction factors to apply to at least one of the time synchronization or the frequency synchronization between the UE and the XR device; transmitting, to the XR device and at a second periodicity, a second pilot signal; receiving, from the XR device, a second control message comprising one or more time domain samples of the second pilot signal; and transmitting, based at least in part on the one or more time domain samples, a third control message indicating a second set of correction factors to apply to the time synchronization between the UE and the XR device.

Aspect 2: The method of aspect 1, wherein transmitting the second pilot signal further comprises: transmitting a synchronization loop indication message indicating a transmission of the second pilot signal.

Aspect 3: The method of any of aspects 1 through 2, further comprising: measuring a CFO for the XR device based at least in part on receiving the one or more first pilot signals, wherein the first set of correction factors is based at least in part on the CFO.

Aspect 4: The method of aspect 3, wherein measuring the CFO comprises: averaging the one or more first pilot signals; or applying a loop filter to the one or more first pilot signals.

Aspect 5: The method of any of aspects 3 through 4, further comprising: calculating a PPM error or one or more frequency offsets based at least in part on the CFO, wherein the first set of correction factors comprises the PPM error or the one or more frequency offsets.

Aspect 6: The method of any of aspects 1 through 5, further comprising: measuring a STO for the XR device based at least in part on receiving the second control message, wherein the second set of correction factors is based at least in part on the STO.

Aspect 7: The method of aspect 6, wherein measuring the STO comprises: averaging the one or more time domain samples of the second pilot signal; or applying a loop filter to the one or more time domain samples of the second pilot signal.

Aspect 8: The method of any of aspects 1 through 7, further comprising: transmitting, based at least in part on a channel propagation delay associated with receiving the one or more first pilot signals, an indication of one or more time advance values to apply to the time synchronization between the UE and the XR device, wherein the one or more time advance values are different from the first set of correction factors.

Aspect 9: The method of any of aspects 1 through 8, wherein a quantity of the one or more first pilot signals is based at least in part on a SNR associated with the wireless communication between the UE and the XR device.

Aspect 10: The method of any of aspects 1 through 9, further comprising: transmitting, to the XR device, an indication of the first periodicity and the second periodicity, wherein the second periodicity is less than the first periodicity.

Aspect 11: The method of any of aspects 1 through 10, wherein the one or more first pilot signals or the second pilot signal correspond to least one of an SSB, an SSS, a TRS, a PTRS, a DMRS, or a combination thereof.

Aspect 12: The method of any of aspects 1 through 11, wherein the first control message, the second control message, or the third control message are communicated via SCI Format 1.

Aspect 13: A method for wireless communication by an XR device, comprising: performing an initialization procedure with a UE comprising a time synchronization and a frequency synchronization between the UE and the XR device; transmitting, to the UE and at a first periodicity, one or more first pilot signals; receiving, based at least in part on transmitting the one or more first pilot signals, a first control message indicating a first set of correction factors to apply to at least one of the time synchronization or the frequency synchronization between the UE and the XR device; receiving, from the UE and at a second periodicity, a second pilot signal; transmitting, to the UE, a second control message comprising one or more time domain samples of the second pilot signal; and receiving, based at least in part on the one or more time domain samples, a third control message indicating a second set of correction factors to apply to the time synchronization between the UE and the XR device.

Aspect 14: The method of aspect 13, wherein receiving the second pilot signal further comprises: receiving a synchronization loop indication message indicating a transmission of the second pilot signal.

Aspect 15: The method of any of aspects 13 through 14, wherein the first set of correction factors comprises a PPM error or one or more frequency offsets to apply to at least one of the time synchronization or the frequency synchronization between the UE and the XR device.

Aspect 16: The method of aspect 15, further comprising: applying at least one of the PPM error or the one or more frequency offsets to at least one of an oscillator, a synthesizer, a PLL, a counter, a clock, or a resampling component of the XR device.

Aspect 17: The method of any of aspects 13 through 16, wherein the second set of correction factors comprises a timing offset to apply to the time synchronization between the UE and the XR device.

Aspect 18: The method of aspect 17, further comprising: applying the timing offset to at least one of an oscillator, a synthesizer, a PLL, a counter, a clock, or a resampling component of the XR device.

Aspect 19: The method of any of aspects 13 through 18, further comprising: receiving, based at least in part on a channel propagation delay associated with transmitting the one or more first pilot signals, an indication of one or more time advance values to apply to the time synchronization between the UE and the XR device, wherein the one or more time advance values are different from the first set of correction factors.

Aspect 20: The method of any of aspects 13 through 19, wherein a quantity of the one or more first pilot signals is based at least in part on a SNR associated with the wireless communication between the UE and the XR device.

Aspect 21: The method of any of aspects 13 through 20, further comprising: receiving, from the XR device, an indication of the first periodicity and the second periodicity, wherein the second periodicity is less than the first periodicity.

Aspect 22: The method of any of aspects 13 through 21, wherein the one or more first pilot signals or the second pilot signal correspond to least one of an SSB, an SSS, a TRS, a PTRS, a DMRS, or a combination thereof.

Aspect 23: The method of any of aspects 13 through 22, wherein the first control message, the second control message, or the third control message are communicated via SCI Format 1.

Aspect 24: A UE for wireless communication, comprising one or more memories storing processor-executable code, and one or more processors coupled with the one or more memories and individually or collectively operable to execute the code to cause the UE to perform a method of any of aspects 1 through 12.

Aspect 25: A UE for wireless communication, comprising at least one means for performing a method of any of aspects 1 through 12.

Aspect 26: A non-transitory computer-readable medium storing code for wireless communication, the code comprising instructions executable by a processor to perform a method of any of aspects 1 through 12.

Aspect 27: An XR device for wireless communication, comprising one or more memories storing processor-executable code, and one or more processors coupled with the one or more memories and individually or collectively operable to execute the code to cause the XR device to perform a method of any of aspects 13 through 23.

Aspect 28: An XR device for wireless communication, comprising at least one means for performing a method of any of aspects 13 through 23.

Aspect 29: A non-transitory computer-readable medium storing code for wireless communication, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and one or more processors coupled with the one or more memories and individually or collectively operable to execute the code to cause the UE to:
perform an initialization procedure with an extended reality (XR) device comprising a time synchronization and a frequency synchronization between the UE and the XR device;
receive, from the XR device and at a first periodicity, one or more first pilot signals;
transmit, based at least in part on receiving the one or more first pilot signals, a first control message indicating a first set of correction factors to apply to at least one of the time synchronization or the frequency synchronization between the UE and the XR device;
transmit, to the XR device and at a second periodicity, a second pilot signal;
receive, from the XR device, a second control message comprising one or more time domain samples of the second pilot signal; and
transmit, based at least in part on the one or more time domain samples, a third control message indicating a second set of correction factors to apply to the time synchronization between the UE and the XR device.

2. The UE of claim 1, wherein, to transmit the second pilot signal, the one or more processors are individually or collectively further operable to execute the code to cause the UE to:
transmit a synchronization loop indication message indicating a transmission of the second pilot signal.

3. The UE of claim 1, wherein the one or more processors are individually or collectively further operable to execute the code to cause the UE to:
measure a center frequency offset for the XR device based at least in part on receiving the one or more first pilot signals, wherein the first set of correction factors is based at least in part on the center frequency offset.

4. The UE of claim 3, wherein, to measure the center frequency offset, the one or more processors are individually or collectively operable to execute the code to cause the UE to:
average the one or more first pilot signals; or
apply a loop filter to the one or more first pilot signals.

5. The UE of claim 3, wherein the one or more processors are individually or collectively further operable to execute the code to cause the UE to:
calculate a parts per million error or one or more frequency offsets based at least in part on the center frequency offset, wherein the first set of correction factors comprises the parts per million error or the one or more frequency offsets.

6. The UE of claim 1, wherein the one or more processors are individually or collectively further operable to execute the code to cause the UE to:
measure a sampling timing offset for the XR device based at least in part on receiving the second control message, wherein the second set of correction factors is based at least in part on the sampling timing offset.

7. The UE of claim 6, wherein, to measure the sampling timing offset, the one or more processors are individually or collectively operable to execute the code to cause the UE to:
average the one or more time domain samples of the second pilot signal; or
apply a loop filter to the one or more time domain samples of the second pilot signal.

8. The UE of claim 1, wherein the one or more processors are individually or collectively further operable to execute the code to cause the UE to:

transmit, based at least in part on a channel propagation delay associated with receiving the one or more first pilot signals, an indication of one or more time advance values to apply to the time synchronization between the UE and the XR device, wherein the one or more time advance values are different from the first set of correction factors and the second set of correction factors.

9. The UE of claim 1, wherein a quantity of the one or more first pilot signals is based at least in part on a signal to noise ratio associated with a wireless communication between the UE and the XR device.

10. The UE of claim 1, wherein the one or more processors are individually or collectively further operable to execute the code to cause the UE to:

transmit, to the XR device, an indication of the first periodicity and the second periodicity, wherein the second periodicity is less than the first periodicity.

11. The UE of claim 1, wherein the one or more first pilot signals or the second pilot signal correspond to least one of a synchronization signal block, a sidelink synchronization signal, a tracking reference signal, a phase tracking reference signal, a demodulation reference signal, or a combination thereof.

12. The UE of claim 1, wherein:

the first control message, the second control message, or the third control message are communicated via sidelink control information Format 1.

13. An extended reality (XR) device, comprising:

one or more memories storing processor-executable code; and one or more processors coupled with the one or more memories and individually or collectively operable to execute the code to cause the XR device to:

perform an initialization procedure with a user equipment (UE) comprising a time synchronization and a frequency synchronization between the UE and the XR device;

transmit, to the UE and at a first periodicity, one or more first pilot signals;

receive, based at least in part on transmitting the one or more first pilot signals, a first control message indicating a first set of correction factors to apply to at least one of the time synchronization or the frequency synchronization between the UE and the XR device;

receive, from the UE and at a second periodicity, a second pilot signal;

transmit, to the UE, a second control message comprising one or more time domain samples of the second pilot signal; and receive, based at least in part on the one or more time domain samples, a third control message indicating a second set of correction factors to apply to the time synchronization between the UE and the XR device.

14. The XR device of claim 13, wherein, to receive the second pilot signal, the one or more processors are individually or collectively further operable to execute the code to cause the XR device to:

receive a synchronization loop indication message indicating a transmission of the second pilot signal.

15. The XR device of claim 13, wherein the first set of correction factors comprises a parts per million error or one or more frequency offsets to apply to at least one of the time synchronization or the frequency synchronization between the UE and the XR device.

16. The XR device of claim 15, wherein the one or more processors are individually or collectively further operable to execute the code to cause the XR device to:

apply at least one of the parts per million error or the one or more frequency offsets to at least one of an oscillator, a synthesizer, a phase lock loop, a counter, a clock, or a resampling component of the XR device.

17. The XR device of claim 13, wherein the second set of correction factors comprises a timing offset to apply to the time synchronization between the UE and the XR device.

18. The XR device of claim 17, wherein the one or more processors are individually or collectively further operable to execute the code to cause the XR device to:

apply the timing offset to at least one of an oscillator, a synthesizer, a phase lock loop, a counter, a clock, or a resampling component of the XR device.

19. The XR device of claim 13, wherein the one or more processors are individually or collectively further operable to execute the code to cause the XR device to:

receive, based at least in part on a channel propagation delay associated with transmitting the one or more first pilot signals, an indication of one or more time advance values to apply to the time synchronization between the UE and the XR device, wherein the one or more time advance values are different from the first set of correction factors and the second set of correction factors.

20. The XR device of claim 13, wherein a quantity of the one or more first pilot signals is based at least in part on a signal to noise ratio associated with a wireless communication between the UE and the XR device.

21. The XR device of claim 13, wherein the one or more processors are individually or collectively further operable to execute the code to cause the XR device to:

receive, from the UE, an indication of the first periodicity and the second periodicity, wherein the second periodicity is less than the first periodicity.

22. The XR device of claim 13, wherein the one or more first pilot signals or the second pilot signal correspond to least one of a synchronization signal block, a sidelink synchronization signal, a tracking reference signal, a phase tracking reference signal, a demodulation reference signal, or a combination thereof.

23. The XR device of claim 13, wherein:

the first control message, the second control message, or the third control message are communicated via sidelink control information Format 1.

24. A method for wireless communication by a user equipment (UE), comprising:

performing an initialization procedure with an extended reality (XR) device comprising a time synchronization and a frequency synchronization between the UE and the XR device;

receiving, from the XR device and at a first periodicity, one or more first pilot signals;

transmitting, based at least in part on receiving the one or more first pilot signals, a first control message indicating a first set of correction factors to apply to at least one of the time synchronization or the frequency synchronization between the UE and the XR device;

transmitting, to the XR device and at a second periodicity, a second pilot signal;

receiving, from the XR device, a second control message comprising one or more time domain samples of the second pilot signal; and transmitting, based at least in part on the one or more time domain samples, a third control message indicating a second set of correction factors to apply to the time synchronization between the UE and the XR device.

25. The method of claim 24, wherein transmitting the second pilot signal further comprises:

transmitting a synchronization loop indication message indicating a transmission of the second pilot signal.

26. The method of claim 24, further comprising:

measuring a center frequency offset for the XR device based at least in part on receiving the one or more first pilot signals, wherein the first set of correction factors is based at least in part on the center frequency offset.

27. The method of claim 26, further comprising:

calculating a parts per million error or one or more frequency offsets based at least in part on the center frequency offset, wherein the first set of correction factors comprises the parts per million error or the one or more frequency offsets.

28. The method of claim 24, further comprising:

measuring a sampling timing offset for the XR device based at least in part on receiving the second control message, wherein the second set of correction factors is based at least in part on the sampling timing offset.

29. The method of claim 28, wherein measuring the sampling timing offset comprises:

averaging the one or more time domain samples of the second pilot signal; or applying a loop filter to the one or more time domain samples of the second pilot signal.

30. A method for wireless communication by an extended reality (XR) device, comprising:

performing an initialization procedure with a user equipment (UE) comprising a time synchronization and a frequency synchronization between the UE and the XR device;

transmitting, to the UE and at a first periodicity, one or more first pilot signals;

receiving, based at least in part on transmitting the one or more first pilot signals, a first control message indicating a first set of correction factors to apply to at least one of the time synchronization or the frequency synchronization between the UE and the XR device;

receiving, from the UE and at a second periodicity, a second pilot signal;

transmitting, to the UE, a second control message comprising one or more time domain samples of the second pilot signal; and receiving, based at least in part on the one or more time domain samples, a third control message indicating a second set of correction factors to apply to the time synchronization between the UE and the XR device.

* * * * *